(12) United States Patent
Sigalas et al.

(10) Patent No.: US 7,756,367 B2
(45) Date of Patent: Jul. 13, 2010

(54) PHOTONIC SYSTEMS AND METHODS FOR ENCODING DATA IN CARRIER ELECTROMAGNETIC WAVES

(75) Inventors: Mihail Sigalas, Santa Clara, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/479,537

(22) Filed: Jun. 5, 2009

(65) Prior Publication Data

US 2009/0269000 A1 Oct. 29, 2009

Related U.S. Application Data

(62) Division of application No. 11/648,968, filed on Jan. 3, 2007, now Pat. No. 7,561,761.

(51) Int. Cl.
*G02B 6/12* (2006.01)
(52) U.S. Cl. .............................. 385/14; 385/132; 385/8; 385/31; 385/40
(58) Field of Classification Search ................... 385/30, 385/132, 8, 14, 40, 31
See application file for complete search history.

(56) References Cited

U.S. PATENT DOCUMENTS

| | | | |
|---|---|---|---|
| 6,542,682 B2 * | 4/2003 | Cotteverte et al. | 385/125 |
| 6,937,781 B2 | 8/2005 | Shirane et al. | |
| 7,013,061 B2 | 3/2006 | Lee | |
| 7,333,703 B2 | 2/2008 | Hatsuda | |
| 7,546,000 B2 * | 6/2009 | Spillane et al. | 385/14 |
| 7,546,017 B2 * | 6/2009 | Siga et al. | 385/131 |
| 7,561,770 B2 * | 7/2009 | Ty Tan et al. | 385/32 |
| 2003/0039439 A1 | 2/2003 | Deliwala | |
| 2005/0196101 A1 * | 9/2005 | Hamann et al. | 385/40 |
| 2006/0056758 A1 | 3/2006 | Beausoleil | |
| 2006/0119913 A1 * | 6/2006 | Moon | 359/2 |
| 2007/0036479 A1 | 2/2007 | Beausoleil | |
| 2009/0032805 A1 * | 2/2009 | Ty Tan et al. | 257/25 |
| 2009/0034905 A1 * | 2/2009 | Ty Tan et al. | 385/14 |
| 2009/0087132 A1 * | 4/2009 | Sigalas et al. | 385/2 |
| 2009/0239323 A1 * | 9/2009 | Tan et al. | 438/31 |
| 2009/0256136 A1 * | 10/2009 | Tan et al. | 257/22 |

OTHER PUBLICATIONS

Goh, Joel. Design of photonic crystal cavities by genetic algorithms and numerical optimization techniques, Stanford University—Department of Electrical Engineering—Senior Thesis, Jun. 4, 2006.
Hewlett-Packard Development Company, L.P. "Photonic System And Methods For Encoding Data In Carrier Electromagnetic Waves" —PCT/US2008/000026, PCT International Search Report—ISA/KR, Apr. 30, 2008.

* cited by examiner

*Primary Examiner*—Charlie Peng

(57) ABSTRACT

Various embodiments of the present invention are related to photonic systems and methods that can be used to encode data in carrier electromagnetic waves. In one embodiment of the present invention, a method for encoding data in carrier electromagnetic waves is provided. The method comprises: transmitting a number of carrier electromagnetic waves in a first waveguide; coupling one or more of the carrier electromagnetic waves into a resonant cavity of a photonic crystal coupled to the first waveguide; modulating the one or more carrier electromagnetic waves within the resonant cavity in order to generate data encoded electromagnetic waves; and coupling the data encoded electromagnetic waves into a second waveguide.

5 Claims, 22 Drawing Sheets

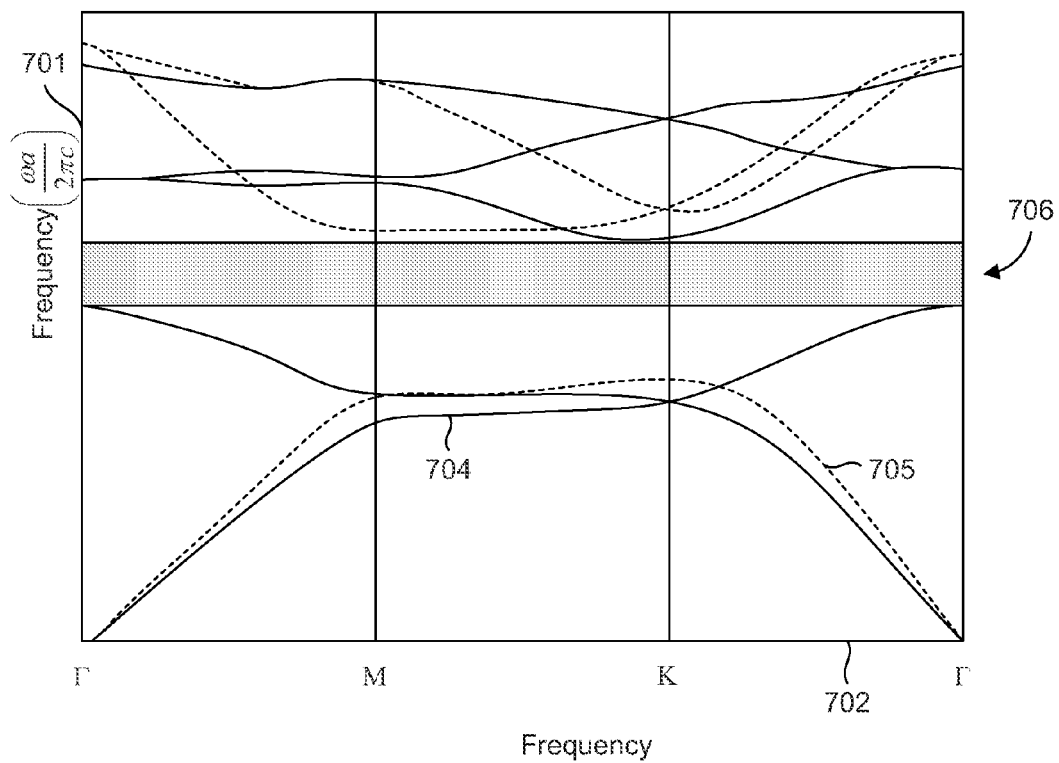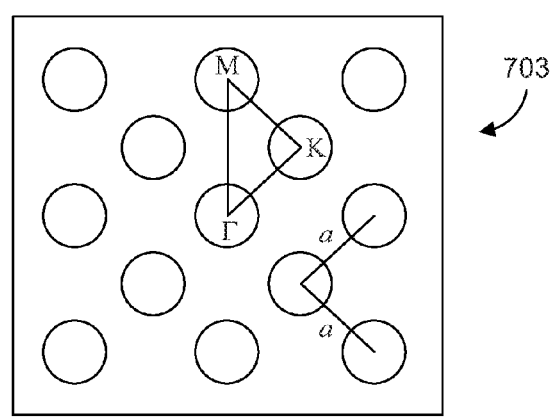
Figure 7

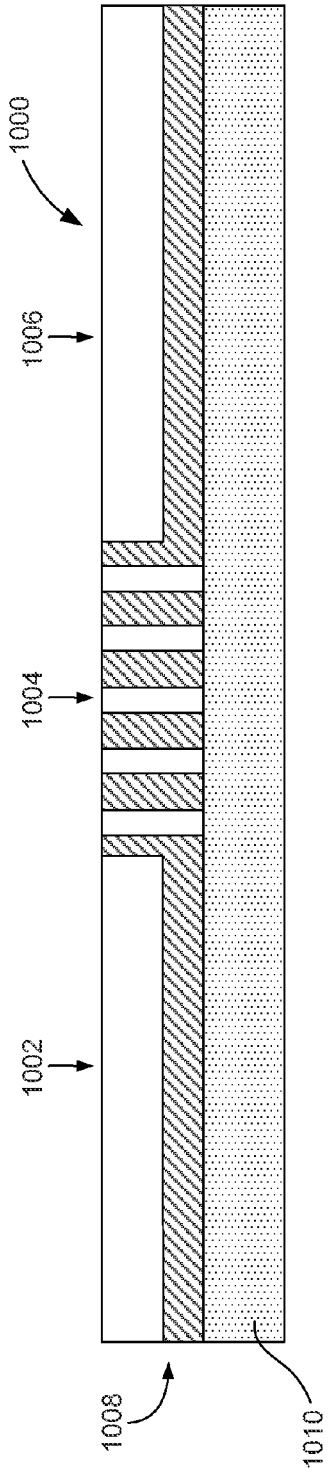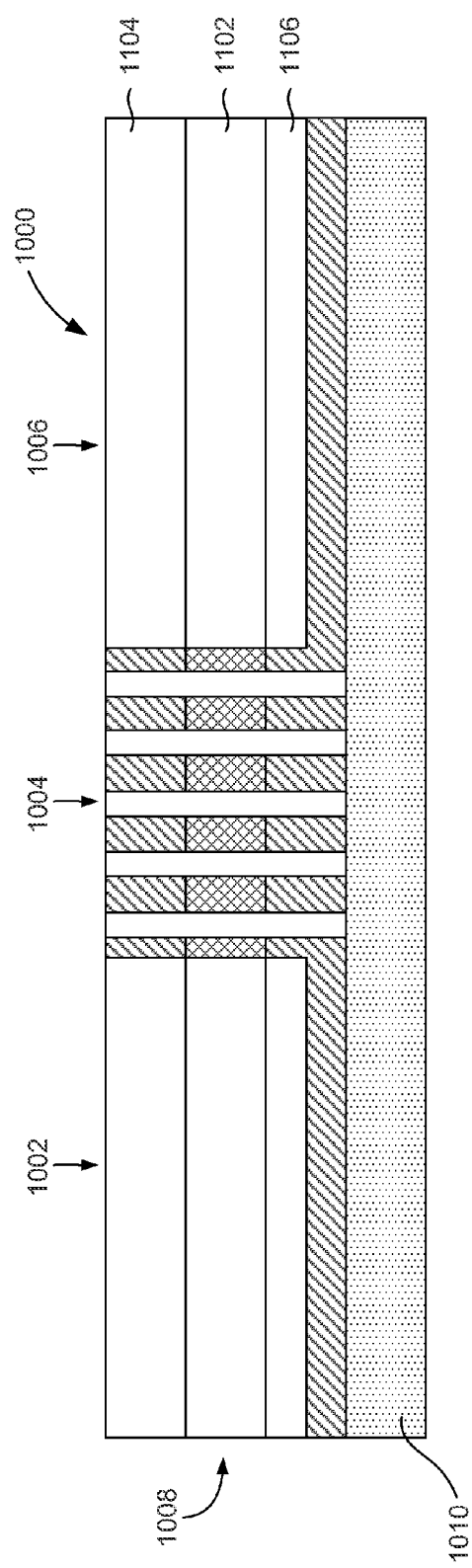

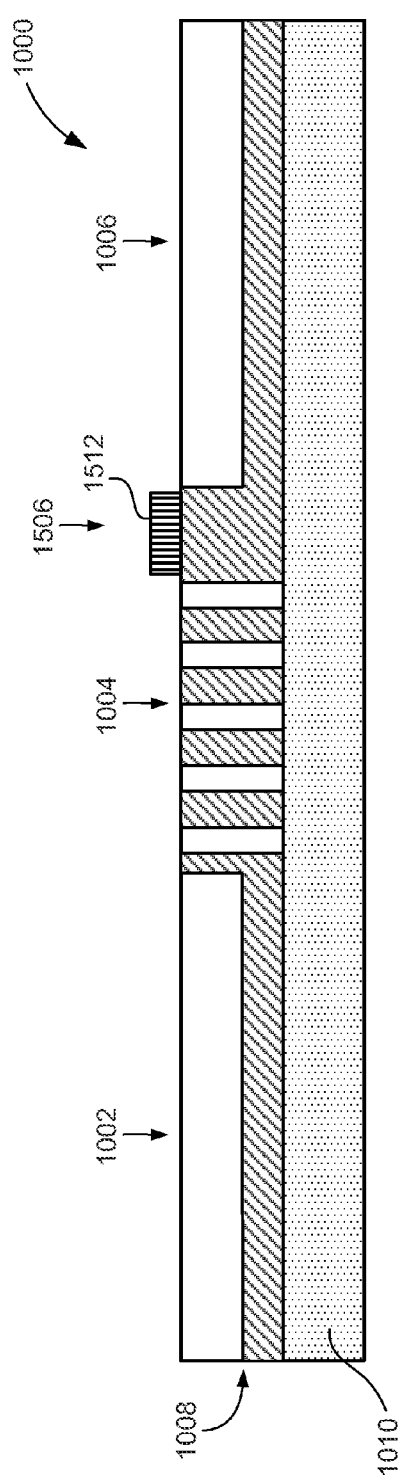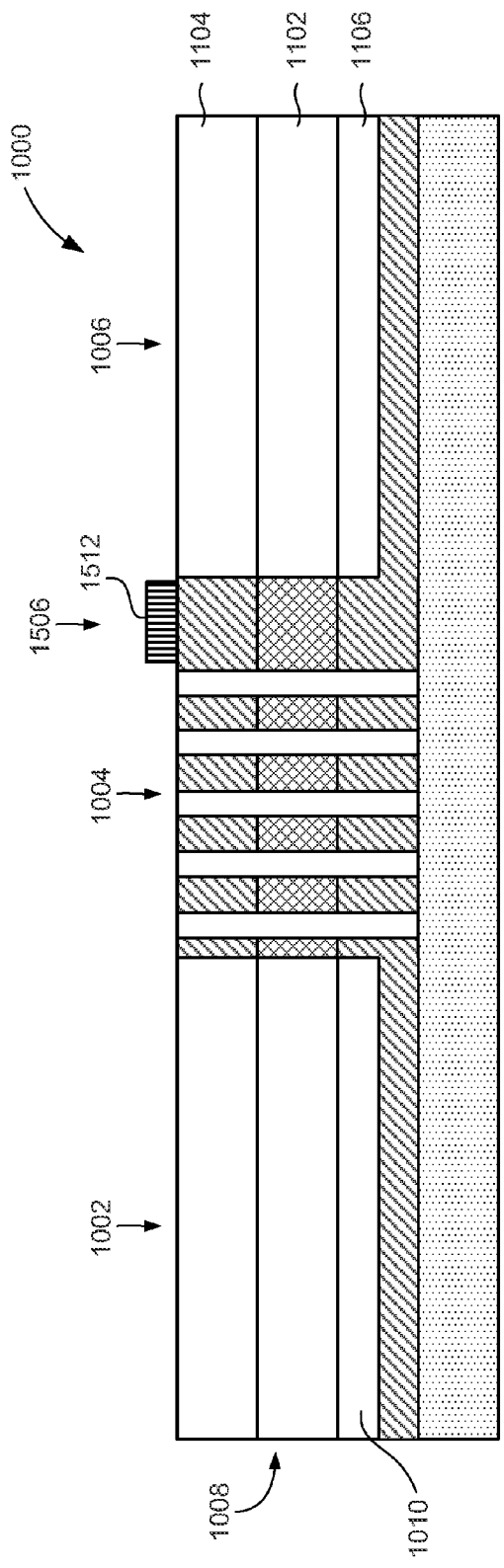

PHOTONIC SYSTEMS AND METHODS FOR ENCODING DATA IN CARRIER ELECTROMAGNETIC WAVES

CROSS-REFERENCE TO RELATED APPLICATION

The present application is a divisional application of application Ser. No. 11/648,968, filed Jan. 3, 2007, now U.S. Pat. No. 7,561,761 the contents of which are hereby incorporated herein in their entireties.

TECHNICAL FIELD

Embodiments of the present invention are related to photonic systems, and, in particular, to photonic systems that can be configured to encode data in carrier electromagnetic waves.

BACKGROUND

Since the late 1970s, photonic devices have increasingly supplanted conventional electronic devices for transmitting data. Rather than encoding data in electrical signals and transmitting the encoded electrical signals via signal lines, the data can be encoded in electromagnetic waves and transmitted via photonic devices, such as optical fibers and photonic crystal waveguides. Transmitting encoded electromagnetic waves via photonic devices have a number of advantages over transmitting encoded electrical signals via signal lines. First, signal degradation or loss is much less for electromagnetic waves transmitted via photonic devices than for electrical signals transmitted via signal lines. Second, photonic devices provide a much higher bandwidth than signal lines. For example, a single Cu or Al wire can only transmit a single electrical signal, while a single optical fiber can be configured to transmit about 100 or more electromagnetic waves. Finally, electromagnetic waves provide a much higher data transmission rate and eliminate electromagnetic interference.

Recently, advances in materials science and semiconductor fabrication techniques have made it possible to fabricate computational devices that integrate photonic devices with electronic devices, such as memory and processors. In particular, photonic integrated circuits ("PICs") are the photonic device equivalent of electronic integrated circuits. PICs can be implemented on a small wafer of semiconductor material that forms the base for an integrated circuit and may include a number of waveguides for transmitting data encoded in electromagnetic waves to a number of integrated photonic and electronic devices. Unlike electronic integrated circuits where Si is the primary material, PICs may be composed of a variety of materials. For example, PICs may be composed of a single semiconductor, such as Si on an insulator, or binary and ternary semiconductors, such as InP and $Al_xGa_{1-x}As$, where x varies from 0 to 1.

In order to effectively implement PICs, a number of passive and active photonic components are needed. Waveguides and attenuators are examples of passive photonic components that can be fabricated using conventional epitaxial and lithographic methods and may be used to direct the propagation of electromagnetic waves between electronic devices. Physicists, engineers, and computer scientists have recognized a need for active photonic components, such as modulators and switches, which can be implemented in PICs to encode data in, and regulate transmission of, electromagnetic waves.

SUMMARY

Various embodiments of the present invention are related to photonic systems and methods that can be used to encode data in electromagnetic waves. In one embodiment of the present invention, a photonic system comprises a first waveguide configured to transmit a number of electromagnetic waves. The photonic system includes a photonic crystal with a resonant cavity and is configured to selectively and evanescently couple one or more of the electromagnetic waves from the first waveguide into the resonant cavity. The photonic system also includes a second waveguide positioned to transmit and extract one or more electromagnetic waves from the resonant cavity via evanescent coupling.

BRIEF DESCRIPTION OF THE DRAWINGS

FIG. 7 illustrates a photonic band structure of transverse electric field and magnetic field modes propagating in the two-dimensional photonic crystal shown in FIG. 4.

FIG. 11A illustrates a cross-sectional view of the first photonic system, shown in FIG. 10, with a single semiconductor transmission layer that represents an embodiment of the present invention.

FIG. 11B illustrates a cross-sectional view of the first photonic system, shown in FIG. 10, with a three-layer semiconductor transmission layer that represents an embodiment of the present invention.

FIG. 16A illustrates a cross-sectional view of the second photonic system, shown in FIG. 15, with a single semiconductor transmission layer that represents an embodiment of the present invention.

FIG. 16B illustrates a cross-sectional view of the second photonic system, shown in FIG. 15, with a three-layer semiconductor transmission layer that represents an embodiment of the present invention.

DETAILED DESCRIPTION OF THE INVENTION

Various embodiments of the present invention are related to photonic systems and methods that can be used to regulate transmission of, and encode data in, electromagnetic waves. Note that the term "photonic" as used to describe various embodiments of the present invention refers to devices that can be used to transmit either classical electromagnetic waves or quantized electromagnetic waves with wavelengths that span the electromagnetic spectrum. In other words, the term "photonic" as used to describe embodiments of the present invention is not limited to devices for transmitting quanta of electromagnetic waves called "photons." In order to assist readers in understanding descriptions of various embodiments of the present invention, an overview of photonic crystals, waveguides, and resonant cavities is provided in a first subsection. Various system and method embodiments of the present invention are described in a second subsection.

An Overview of Photonic Crystals, Waveguides, and Resonant Cavities

Embodiments of the present invention employ concepts in photonic crystals, ridge waveguides, and other photonic devices. The textbooks *Fundamentals of Optical Waveguides*, by Katsunari Okamoto, Elsevier Inc. 2005; *Optical Waveguide Theory*, by Snyder and Love, Chapman and Hall, London, 1983; and *Photonic Crystals*, by Jean-Michel Lourtioz, Springer-Verlag, Berlin, 2005 are just of few of many references in this field. In this subsection, topics in photonic crystals that relate to embodiments of the present invention are described. Additional details regarding ridge waveguides and other photonic devices can be obtained from the above-referenced textbooks, or from many other textbooks, papers, and journal articles related to this field.

Figure 1:
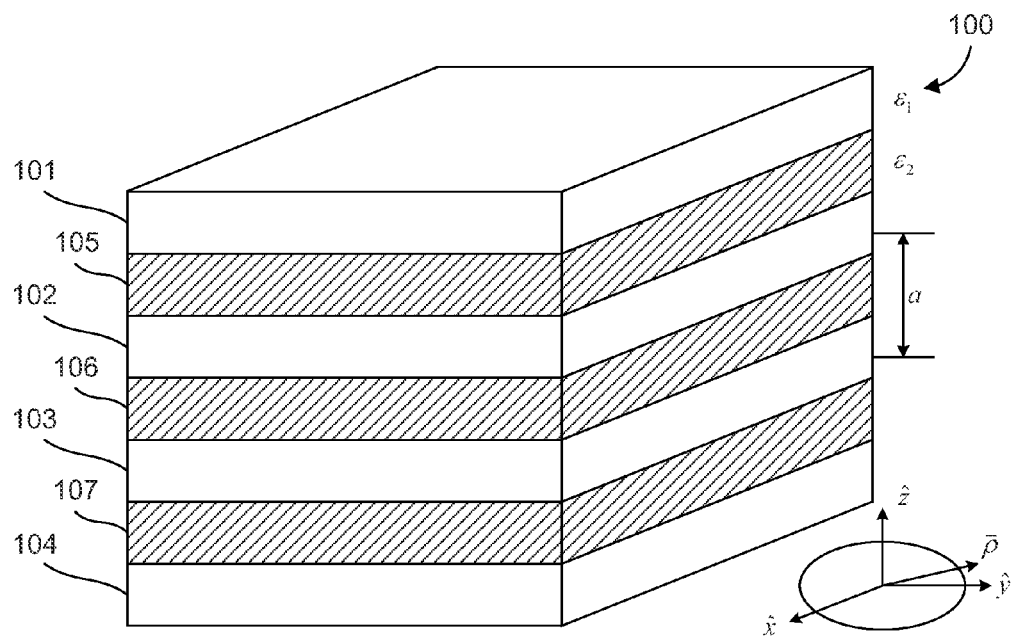
FIG. 1 illustrates an example of a one-dimensional photonic crystal.
Figure 2:
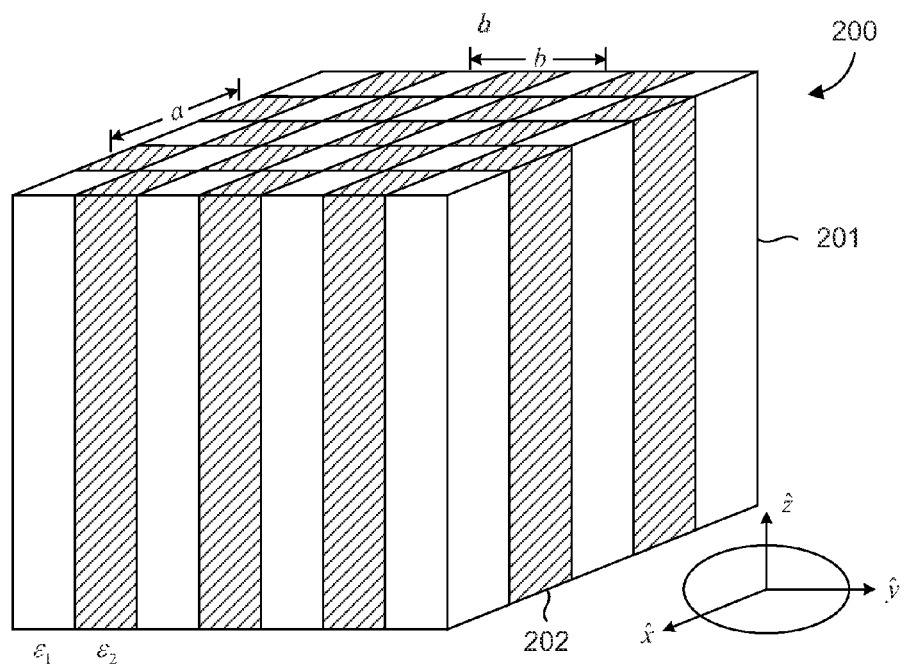
FIG. 2 illustrates an example of a two-dimensional photonic crystal.

Photonic crystals are photonic devices comprised of two or more different materials with dielectric properties that, when combined together in a regular pattern, can modify the propagation characteristics of electromagnetic radiation ("ER"). FIGS. 1 and 2 illustrate two of many different possible patterns in which two different materials with different dielectric properties can be combined to form a photonic crystal. Photonic crystals are typically identified by the number of directions in which the dielectric pattern is periodic. For example, FIG. 1 illustrates an example of a one-dimensional photonic crystal. In FIG. 1, a photonic crystal 100 is comprised of seven layers of two different dielectrics that alternate periodically in the z-direction. Unshaded layers 101-104 are comprised of a first dielectric having a dielectric constant $\in_1$, and hash-marked layers 105-107 are comprised of a second dielectric having a different dielectric constant $\in_2$. The layers are regularly spaced with a repeat distance called a "lattice constant," in the case of the lattice constant shown in FIG. 1, lattice constant a. FIG. 2 illustrates an example of a two-dimensional photonic crystal. The two-dimensional photonic crystal 200 comprises alternating layers of two different dielectrics, and is periodic in both the x-direction and the y-direction with two lattice constants a and b. Unshaded regions, such as region 201, are comprised of a first dielectric having dielectric constant $\in_1$, and hash-marked regions, such as region 202, are comprised of a second dielectric having a different dielectric constant $\in_2$. Photonic crystals can also be fabricated with repeating patterns in three dimensions. Three-dimensional photonic crystals can be fabricated using spheres, tubes, or other solid shapes comprising a first dielectric embedded in a slab comprising a second dielectric.

ER propagating in a dielectric can be characterized by electromagnetic waves comprising oscillating, orthogonal electric fields, $\vec{E}$, and magnetic fields, $\vec{H}$, and a direction of propagation, $\vec{k}$. The electric and magnetic fields are related by Maxwell's equations:

$$\nabla \cdot \vec{H}(\vec{r}, t) = 0 \qquad \text{Equation 1}$$

$$\nabla \cdot \varepsilon(\vec{r})\vec{E}(\vec{r}, t) = 0 \qquad \text{Equation 2}$$

$$\nabla \times \vec{E}(\vec{r}, t) = -\frac{\partial \vec{H}(\vec{r}, t)}{\partial t} \qquad \text{Equation 3}$$

$$\nabla \times \vec{H}(\vec{r}, t) = \varepsilon(\vec{r})\frac{\partial \vec{E}(\vec{r}, t)}{\partial t} \qquad \text{Equation 4}$$

where $\vec{r}$ is spatial displacement of an electromagnetic wave in the dielectric, t is time, and $\in(\vec{r})$ is a dielectric constant.

Because dielectrics do not generally support free charges or free currents, Equations 1-4 do not include a charge density term or a volume current density term. Equations 3 and 4, the curl equations, are linear differential equations. In both equations, the left sides express the dependence of a field on the independent spatial displacement $\vec{r}$, and the right sides express the dependence of a field on t. The only way for a differential quantity that varies with respect to $\vec{r}$ to remain equal to a quantity that varies with respect to t, is for the differential quantities to equal the same constant value. Both sides of Equations 3 and 4 are equal to a constant, and the method of separation of variables can be applied to obtain:

$$\vec{H}(\vec{r},t)=\vec{H}(\vec{r})\exp(i\omega t)$$

$$\vec{E}(\vec{r},t)=\vec{E}(\vec{r})\exp(i\omega t)$$

where ω is the angular frequency of an electromagnetic wave propagating in a dielectric.

Maxwell's curl Equations 3 and 4 can be decoupled by dividing Equation 4 by the dielectric constant $\in(\vec{r})$, applying the curl operator, and substituting Equation 3 for the curl of the electric field to give:

$$\Theta\vec{H}(\vec{r})=\omega^2\vec{H}(\vec{r}) \quad \text{Equation 5}$$

where $$\Theta = \nabla \times \left(\frac{1}{\varepsilon(r)}\nabla \times\right)$$

is a differential operator.

Equation 5 is an eigenvalue equation, where the eigenvalues are $\omega^2$, and the eigenfunctions are the corresponding magnetic fields $\vec{H}(\vec{r})$. After the magnetic fields $\vec{H}(\vec{r})$ are determined according to Equation 5, the electric field $\vec{E}(\vec{r})$ can be obtained by substituting $\vec{H}(\vec{r},t)$ into Equation 3 and solving for $\vec{E}(\vec{r})$.

For finite dimensional photonic crystals, such as the photonic crystals shown in FIGS. 1 and 2, the eigenvalues and eigenfunctions of Equations 5 are quantized to give:

$$\Theta\vec{H}_j(\vec{r})=\omega_j^2\vec{H}_j(\vec{r})$$

where j is a non-negative integer value called the "band index" that labels the harmonic modes of the magnetic field $\vec{H}(\vec{r})$ in order of increasing angular frequency.

The translational symmetry of the photonic crystal can be used to determine the functional form of the magnetic fields $\vec{H}_j(\vec{r})$. For example, the functional form of the magnetic fields $\vec{H}_j(\vec{r})$ propagating in the photonic crystal 100 are given by the following:

$$\vec{H}_{j,k_{||},k_z}(\vec{r})=\exp(i\vec{k}_{||}\cdot\vec{\rho})\exp(ik_z z)\vec{u}_{j,k_{||},k_z}(z) \quad \text{Equation 6}$$

where $\vec{\rho}$ is an xy-plane vector, $\vec{k}_{||}$ is an xy-plane wave vector, $k_z$ is a z-direction wave vector component, and $\vec{u}_{n,k_{||},k_z}(z)$ is a periodic function in the z-direction. The exponential term $\exp(i\vec{k}_{||}\cdot\vec{\rho})$ in Equation 6 arises from the continuous translational symmetry of ER propagating through the dielectric layers in the xy-plane. However, the term $\exp(ik_z z)\vec{u}_{j,k_{||},k_z}(z)$ in Equation 6 arises from Bloch's theorem and the discrete translational symmetry imposed in the z-direction by the periodicity of the dielectric constant of the photonic crystal 100, given by:

$$\in(\vec{r})=\in(\vec{r}+\vec{R})$$

where $\vec{R}=al\hat{z}$, a is a lattice constant determined by the regular pattern of the dielectric layers, and l is an integer.

The magnetic fields $\vec{H}_{j,k_{||},k_z}(\vec{r})$ are periodic for integral multiples of 2π/a. As a result, the associated angular frequencies are also periodic:

$$\omega_j(k_z) = \omega_j\left(k_z + \frac{m2\pi}{a}\right) \quad \text{Equation 7}$$

Differences in the dielectric pattern of a photonic crystal creates one or more range of frequencies $\omega_j$, referred to as "photonic bandgaps," for which ER is prevented from propagating in the photonic crystal. The photonic bandgap also corresponds to an electromagnetic energy range and a range of wavelengths, denoted by $\lambda_j$, for which the differences between the dielectrics prevents ER absorption and ER propagation. The wavelength $\lambda_j$ of ER transmitted through a photonic crystal is related to the angular frequency $\omega_j$:

$$\lambda_j = \frac{2\pi v}{\omega_j}$$

where v is the velocity of ER in the photonic crystal. Certain ER frequency ranges are not transmitted through a photonic crystal because high-frequency harmonic modes tend to concentrate electromagnetic energy in dielectric regions with a low dielectric constant, while low-frequency harmonic modes tend to concentrate electromagnetic energy in dielectric regions with a high dielectric constant. The electromagnetic energy, W, can be determined from the variational principle as follows:

$$W(\vec{H}) = \frac{1}{2(\vec{H},\vec{H})}\int d\vec{r}\frac{1}{\varepsilon(\vec{r})}|\nabla \times \vec{H}(\vec{r})|^2$$

where $(\vec{H},\vec{H})=\int d\vec{r}\,\vec{H}(\vec{r})^*\vec{H}(\vec{r})$, and "*" represents the complex conjugate. The electromagnetic energy is lower for harmonic modes propagating in regions with a high dielectric constant than for modes propagating in regions of a photonic crystal with a low dielectric constant.

The size of and range of frequencies within a photonic bandgap of a one-dimensional photonic crystal depends on the relative difference between the dielectric constants of the dielectrics comprising a photonic crystal. One-dimensional photonic crystals with large relative differences between the dielectric constants of the materials comprising the photonic crystal have larger photonic bandgaps at higher frequency ranges than photonic crystals with smaller relative differences between the dielectric constants.

Figure 3A:
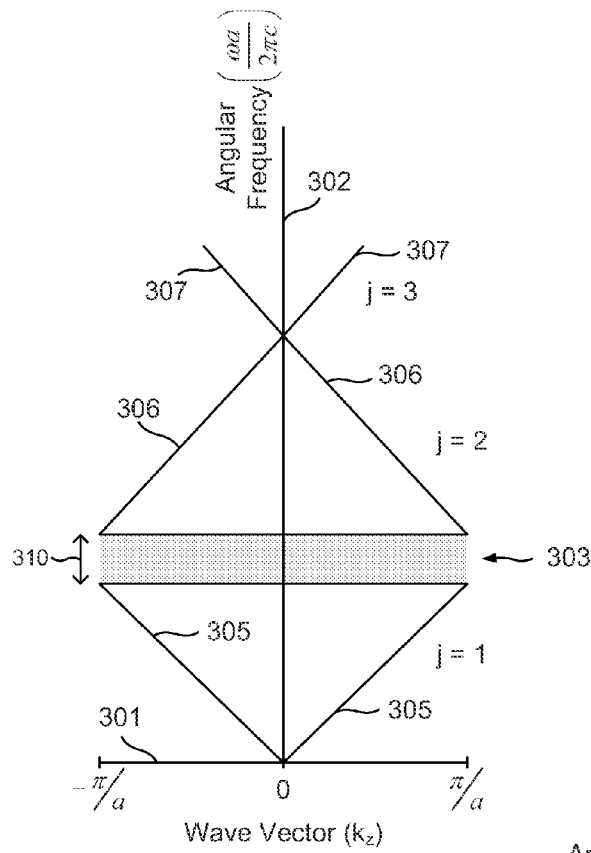
FIGS. 3A-3B are hypothetical plots of frequency versus wave vector z-component for a first one-dimensional photonic crystal and a second one-dimensional photonic crystal, respectively.
Figure 3B:
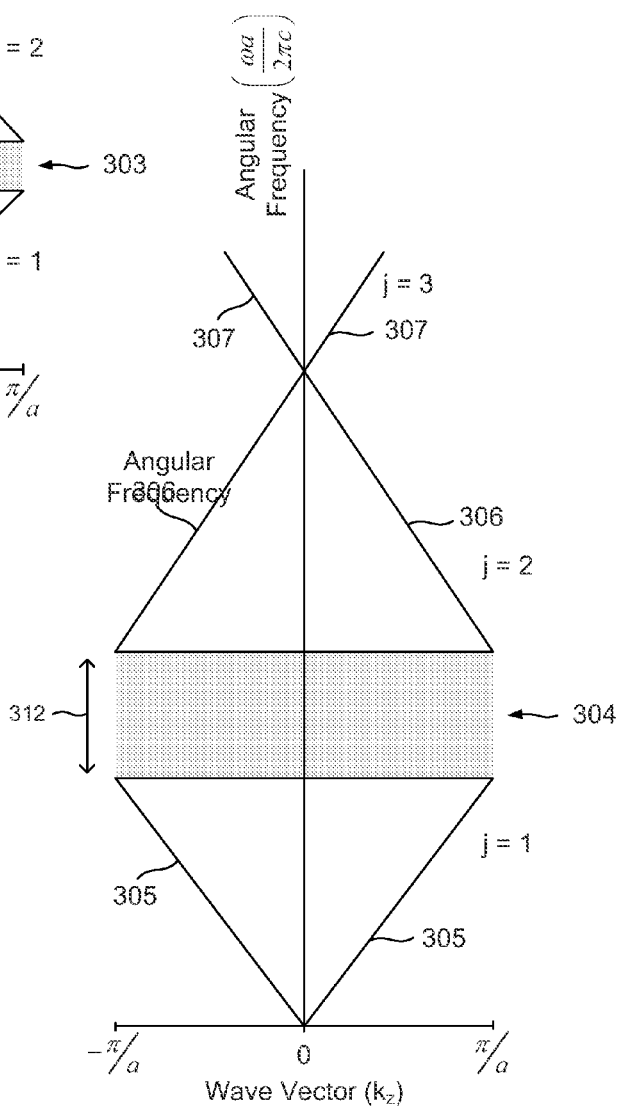

FIGS. 3A-3B are hypothetical plots of frequency ωa/2πc versus wave vector z-component, $k_z$, for a first one-dimensional photonic crystal and a second one-dimensional photonic crystal, respectively. In FIGS. 3A-3B, horizontal axes, such as horizontal axis 301, correspond to wave vector z-component $k_z$, and vertical axes, such as vertical axis 302, correspond to the frequency. Because the frequencies $\omega_j$ are periodic, as described above with reference to Equation 7, frequencies $\omega_j\alpha/2\pi c$ are plotted with respect to wave vector z-component range $-\pi/\alpha$ and $\pi/\alpha$ for angular frequency bands j equal to 1, 2, and 3. The photonic bandgaps are identified by shaded regions 303 and 304. Lines 305, 306, and 307 correspond to the first, second, and third angular frequency bands (=1, 2, and 3). The width 310 of the photonic bandgap 303, in FIG. 3A, is smaller than the width 312 of the photonic bandgap 304, in FIG. 3B, because the relative difference between the dielectric constants of the materials comprising the first photonic crystal is smaller than the relative difference between the dielectric constants of materials comprising the second photonic crystal. Also, the photonic bandgap 303 covers a lower range of frequencies than the range of frequencies covered by photonic bandgap 304.

Figure 4:
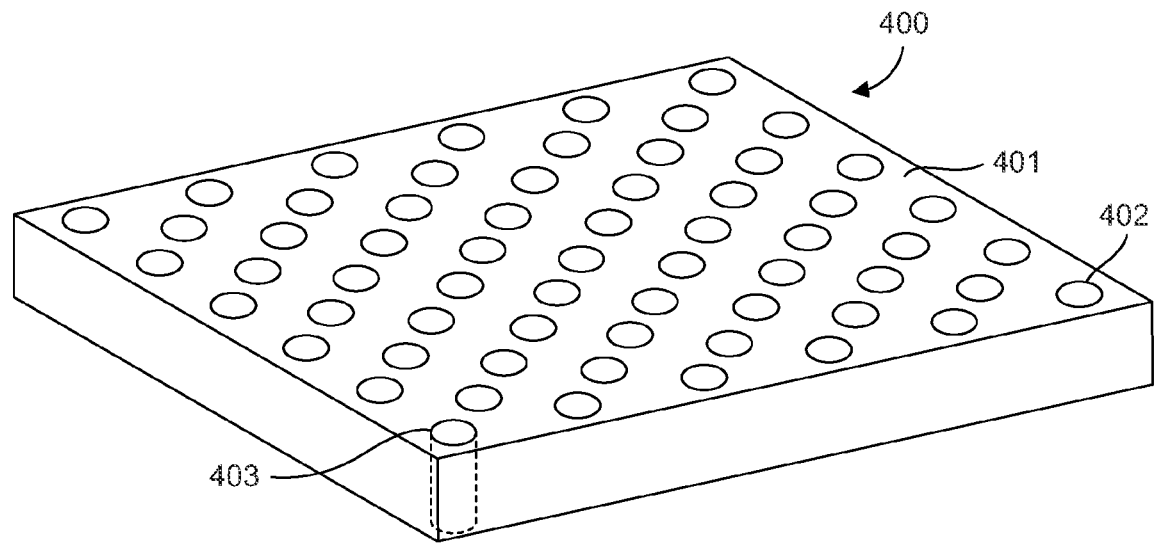
FIGS. 4-5 illustrate perspective views of two two-dimensional photonic crystals.
Figure 5:
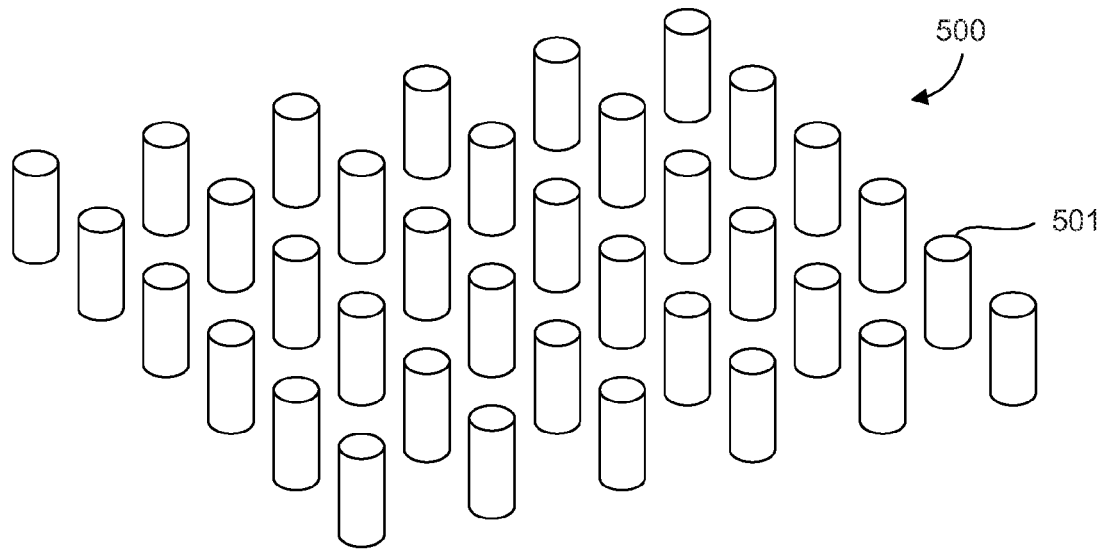

Two-dimensional photonic crystals can be comprised of a regular lattice of cylindrical holes fabricated in a dielectric slab. The cylindrical holes can be air holes or holes filled with a dielectric material different from the dielectric material of the photonic slab. FIG. 4 illustrates a perspective view of a two-dimensional photonic crystal. In FIG. 4, a photonic crystal 400 is comprised of a dielectric slab 401 with a regular lattice of embedded cylindrical holes, such as column 402. The cylindrical holes extend from the top surface to the bottom surface of the slab 401, as indicated by a cylindrical hole 403, and can be holes filled with air or any other material having a dielectric constant different from the dielectric constant of the slab 401. Two-dimensional photonic crystals can also be comprised of a regular lattice arrangement of cylindrical columns surrounded by a gas or a liquid. FIG. 5 illustrates a two-dimensional photonic crystal 500 having a regular square lattice of solid cylindrical columns, such as a cylindrical column 501, surrounded by fluid, such as gas or liquid, with a dielectric constant different from the cylindrical columns.

Figure 6A:
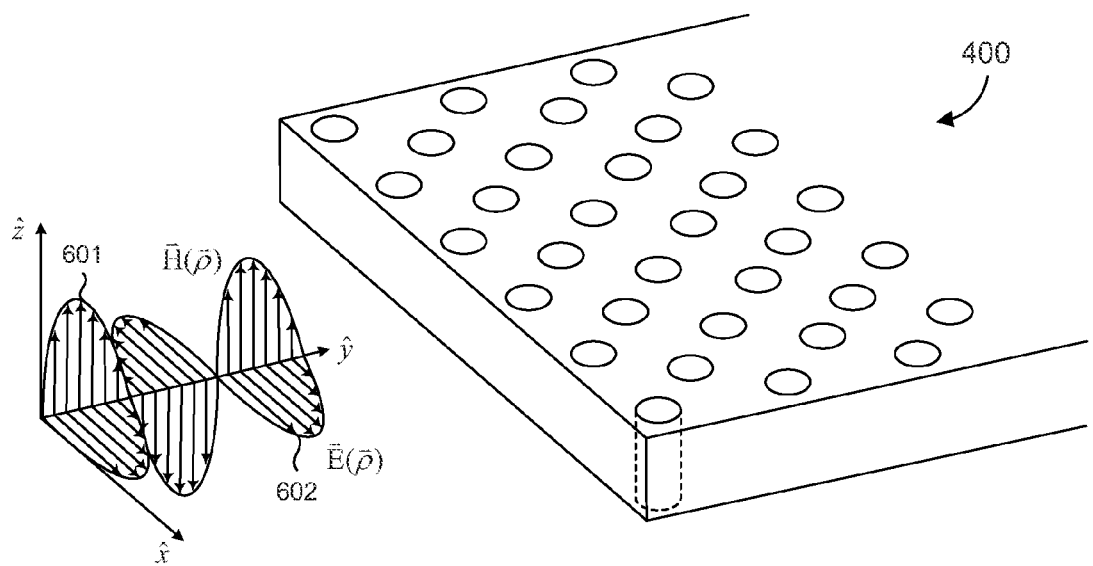
FIGS. 6A-6B illustrate propagation of a transverse electric field and magnetic field modes in the two-dimensional photonic crystal shown in FIG. 5.
Figure 6B:
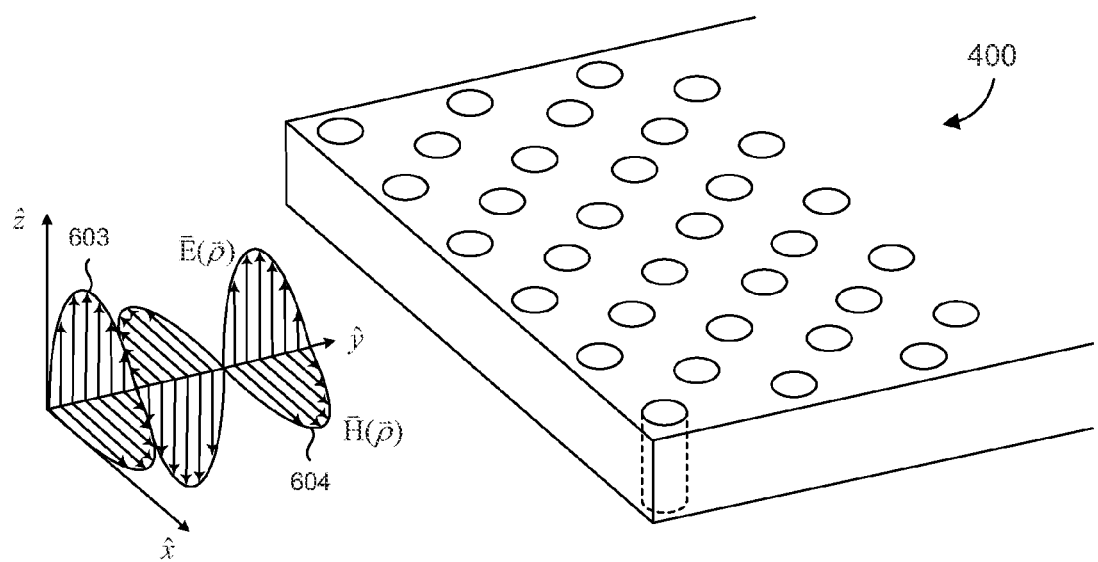

Two-dimensional photonic crystals polarize ER propagating in the periodic plane of the photonic crystal, and the electric and magnetic fields can be classified into two distinct polarizations: (1) the transverse electric-field ("TE") modes; and (2) the transverse magnetic-field ("TM") modes. The TE have $\vec{H}(\vec{\rho})$ directed normal to the periodic plane of the photonic crystal and $\vec{E}(\vec{\rho})$ directed in the periodic plane of the photonic crystal, while the TM have $\vec{E}(\vec{\rho})$ directed normal to the periodic plane of the photonic crystal and $\vec{H}(\vec{\rho})$ directed in the periodic plane of the photonic crystal. FIGS. 6A-6B illustrate propagation of TE and TM modes in the two-dimensional photonic crystal shown in FIG. 4. The periodic plane of the photonic crystal 400 lies in the xy-plane, the cylindrical holes are parallel to the z-direction, and ER propagates through the photonic crystal 400 in the y-direction. In FIG. 6A, an oscillating curve 601 represents the $\vec{H}(\vec{\rho})$ mode directed normal to the xy-plane, and an oscillating curve 602 represents the orthogonal $\vec{E}(\vec{\rho})$ mode directed in the xy-plane. In FIG. 6B, an oscillating curve 603 represents the $\vec{E}(\vec{\rho})$ mode directed normal to the xy-plane, and an oscillating curve 604 represents the orthogonal $\vec{H}(\vec{\rho})$ mode directed in the xy-plane.

FIG. 7 illustrates a photonic band structure of TM and TE modes of an ER propagating in the photonic crystal shown in FIG. 4. In FIG. 7, a vertical axis 701 represents the angular frequency of ER propagating in the photonic crystal 400, and a horizontal axis 702 represents the ER propagation paths between lattice points labeled Γ, M, and K in a photonic crystal segment 703 of the photonic crystal 400, shown in FIG. 4. Solid lines, such as solid line 704, represent TM modes, and dashed lines, such as dashed line 705, represent the TE modes. A shaded region 706 identifies a photonic bandgap in which neither the TE nor TM modes are permitted to propagate in the photonic crystal 400.

The width and the frequency range covered by photonic bandgaps in two-dimensional photonic crystal slabs, such as the photonic bandgap 706, depends on the periodic spacing of the cylindrical holes, represented by lattice constant a, and the relative difference between the dielectric constant of the slab and the dielectric constant of the cylindrical holes. Also, the frequency range covered by photonic bandgap 706 can be shifted to a higher frequency range for larger relative differences between the dielectric constant of the slab and the dielectric constant of the cylindrical holes, while the photonic bandgap 706 can be shifted to a lower frequency range for smaller relative differences between the dielectric constant of the slab and the dielectric constant of the cylindrical holes.

Two-dimensional photonic crystals can be designed to reflect ER within a specified frequency band. As a result, a two-dimensional photonic crystal can be designed and fabricated as a frequency-band stop filter to prevent the propagation of ER having frequencies within the photonic bandgap of the photonic crystal. Generally, the size and relative spacing of cylindrical holes control which wavelengths of ER are prohibited from propagating in the two-dimensional photonic crystal. However, defects can be introduced into the lattice of cylindrical holes to produce particular localized components. In particular, a point defect, also referred to as a "resonant cavity," can be fabricated to provide a resonator that temporarily traps a narrow range of frequencies or wavelengths of ER. A line defect, also referred to as a "waveguide," can be fabricated to transmit ER with frequency ranges or wavelengths that lie within a frequency range of a photonic bandgap. As a result, a three-dimensional photonic crystal slab can be thought of as two-dimensional crystal having a refractive index n that depends on the thickness of the slab.

Figure 8:
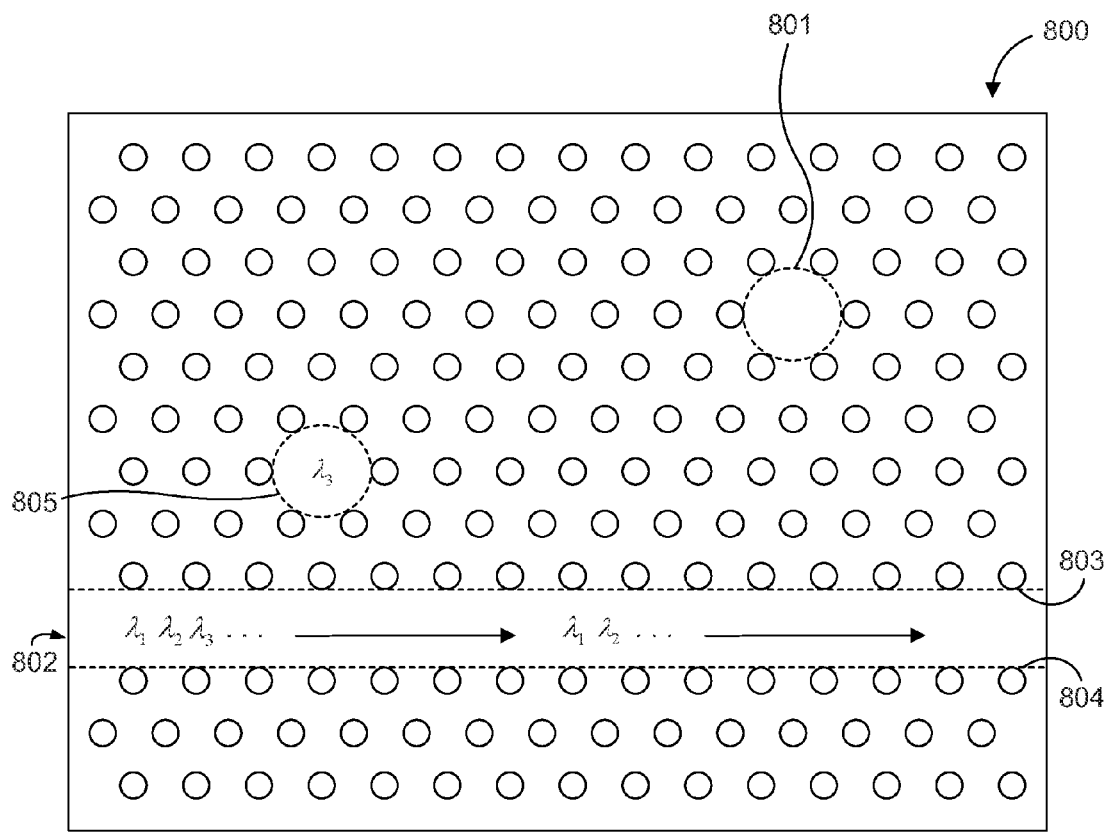
FIG. 8 illustrates an example of a photonic crystal with two resonant cavities and a waveguide.

FIG. 8 illustrates an example of a photonic crystal with two resonant cavities and a waveguide. A resonant cavity can be created in a two-dimensional photonic crystal slab by omitting, increasing, or decreasing the size of a select cylindrical hole. For example, a resonant cavity 801 is created in a photonic crystal 800 by omitting a cylindrical hole, as indicated by the empty region surrounded by a dashed-line circle. Resonant cavities 801 and 805 are surrounded by effectively reflecting walls that temporarily trap ER in the frequency range of the photonic bandgap. Resonant cavities can channel ER within a narrow frequency band in a direction perpendicular to the plane of the photonic crystal. For example, the resonant cavity 801 can trap localized TM modes and TE modes within a narrow frequency band of the photonic bandgap. Unless the photonic crystal 800 is sandwiched between two reflective plates or dielectrics that create total internal reflection, the ER resonating in the resonant cavity 801 can escape in the direction perpendicular to the periodic plane of the photonic crystal 800. Each resonant cavity has an associated quality ("Q") factor that provides a measure of how many oscillations take place in a cavity before the ER leaks into the region surrounding the resonant cavity.

Waveguides are photonic transmission paths that can be used to direct ER within a particular frequency range of the photonic bandgap from a first location in a photonic crystal to a second location in the photonic crystal. Waveguides can be fabricated by changing the diameter of certain cylindrical holes within a column or row of cylindrical holes, or by omitting rows of cylindrical holes. For example, in the photonic crystal 800, a dielectric waveguide 802 is created by omitting an entire row of cylindrical holes during fabrication of the photonic crystal 800, as indicated by the empty region between dashed lines 803 and 804. The dielectric waveguide 802 transmits ER with wavelengths $\lambda_0$ and $\lambda_1$ along a single path. Networks of branching waveguides can be used to direct ER in numerous different pathways through the photonic crystal. The diameter of an electromagnetic signal propagating along a waveguide can be as small as $\lambda/3n$, where n is the refractive index of the waveguide, while a harmonic mode volume of a resonant cavity can be as small as $2\lambda/3n$.

Waveguides and resonant cavities may be less than 100% effective in preventing ER from escaping into the area immediately surrounding the waveguides and resonant cavities. For example, ER within a frequency range in the photonic bandgap propagating along a waveguide also tends to diffuse into the region surrounding the waveguide. ER entering the area surrounding a waveguide or a resonant cavity experiences an exponential decay in amplitude, a process called "evanescence." As a result, a resonant cavity can be located within a short distance of a waveguide to allow certain wavelengths of ER carried by the waveguide to be extracted by the resonant cavity. In effect, resonant cavities are filters that can be used to extract a fraction of a certain wavelength of ER propagating in the waveguide. Depending on a resonant cavity Q factor, an extracted ER can remain trapped in a resonant cavity and resonate for a time before leaking into the surroundings or backscattering into the waveguide. For example, in FIG. 8, the resonant cavity 801 is located too far from the waveguide 802 to extract a mode with particular wavelength of ER. However, the resonant cavity 805 is able to extract a fraction of ER with wavelength $\lambda_3$ propagating along the waveguide 802. Thus, a smaller fraction of ER with wavelength $\lambda_3$ may be left to propagate in the waveguide 802 along with ER of wavelengths $\lambda_1$ and $\lambda_2$.

Figure 9:
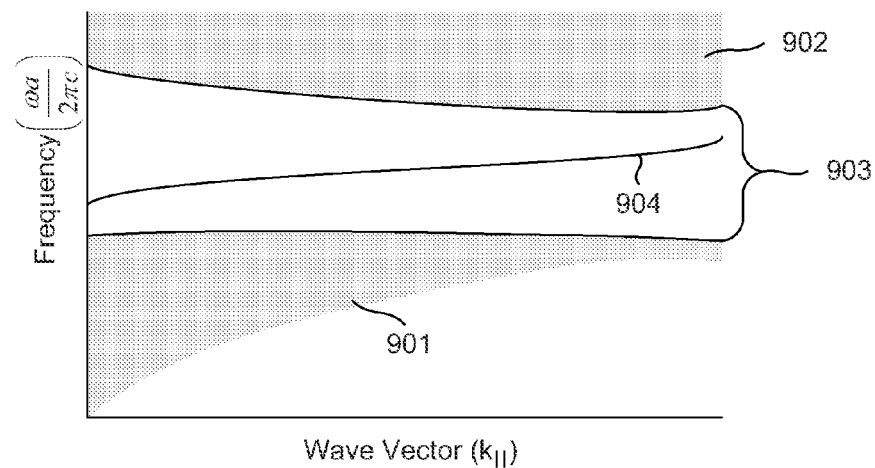
FIG. 9 is a hypothetical plot of frequency versus the magnitude of wave vector for the waveguide of the photonic crystal shown in FIG. 8.

FIG. 9 is a hypothetical plot of frequency versus the magnitude of wave vector $\vec{k}_\square$ for the waveguide of the photonic crystal shown in FIG. 8. In FIG. 9, shaded regions 901 and 902 represent projected first and second band structures of the photonic crystal 800 in the absence of the waveguide 802, shown in FIG. 8. A region 903 identifies the photonic bandgap created by the photonic crystal 800. Line 904 identifies a band of frequencies permitted to propagate in the waveguide 802. The number of frequency bands permitted to propagate in waveguide 802 can be increased by increasing the size of the waveguide 802. For three-dimensional photonic crystals, the three-dimensional lattice parameters, the difference between dielectric constants, and the dimensions of the inclusions determine the frequency range of photonic bandgaps. Waveguides and resonant cavities can also be fabricated in three-dimensional photonic crystals by selectively removing or changing the dimensions of certain inclusions.

EMBODIMENTS OF THE PRESENT INVENTION

Figure 10:
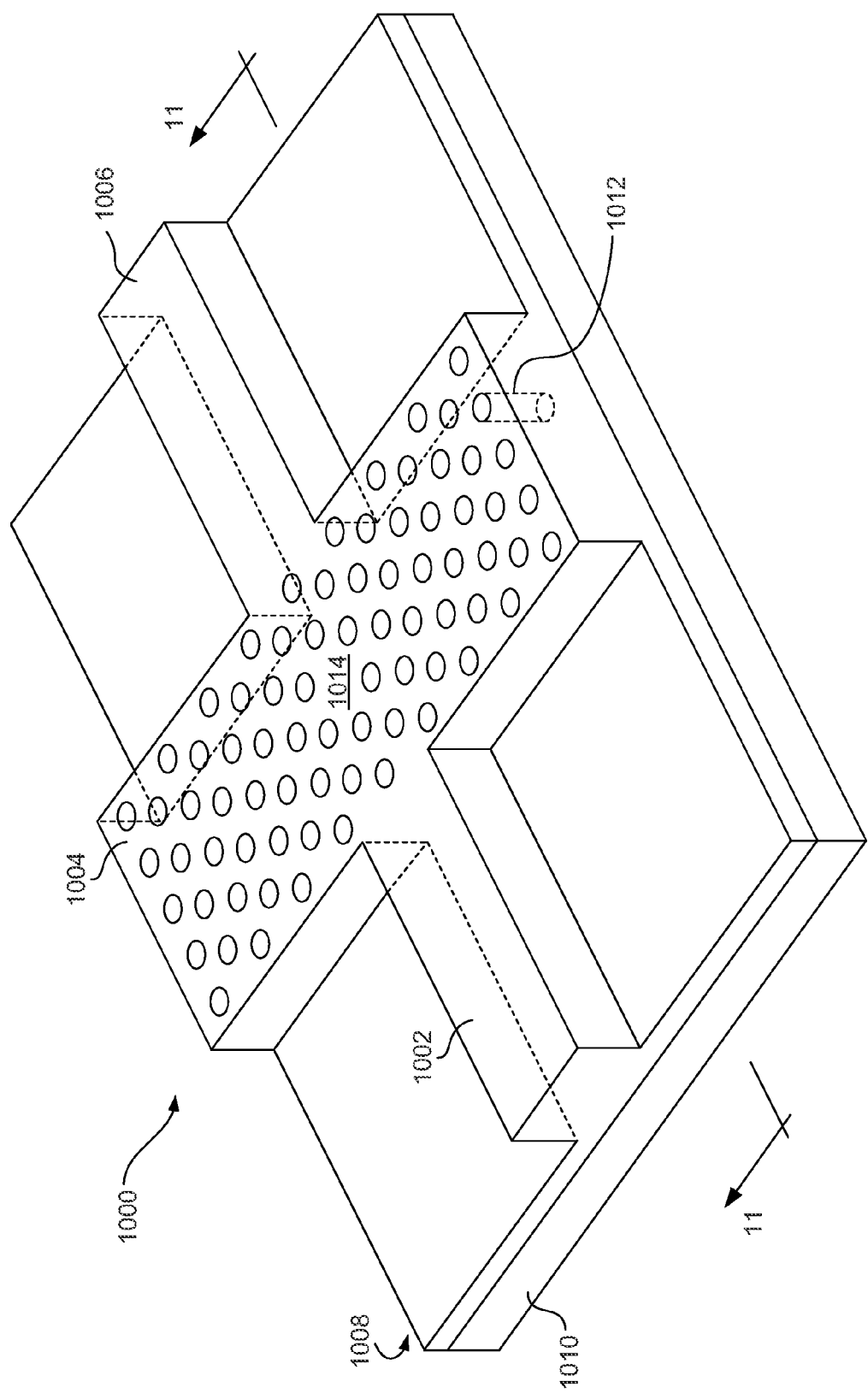
FIG. 10 illustrates an isometric view of a first photonic system that represents an embodiment of the present invention.

FIG. 10 illustrates an isometric view of a first photonic system 1000 that represents an embodiment of the present invention. The photonic system 1000 includes a first ridge waveguide 1002, a photonic crystal 1004, and a second ridge waveguide 1006 that have been formed in a transmission layer 1008. The transmission layer 1008 is supported by a substrate 1010, such as $SiO_2$. The photonic crystal 1004 includes a triangular lattice of holes that span the height of the photonic crystal, such as hole 1012, and also includes a resonant cavity 1014. The resonant cavity 1014 is created by selectively omitting a hole in the lattice of holes approximately midway between the first ridge waveguide 1002 and the second ridge waveguide 1006. The transmission layer 1008 can be formed using chemical vapor deposition, the lattice of holes and ridge waveguides 1002 and 1006 can be formed using any well-known epitaxial or lithographic technique.

The transmission layer 1008 can be composed of a single semiconductor or a plurality of layers, each layer composed of a different kind of semiconductor. FIG. 11A illustrates a cross-sectional view of the photonic system 1000 with a transmission layer 1008 composed of a single semiconductor that represents an embodiment of the present invention. The transmission layer 1008 can be composed of a single semiconductor, such as Si, or binary, ternary, or quaternary semiconductor compounds, such as II-VI or III-V semiconductors. For example, the transmission layer 1008 can be composed of either ZnTe or CdSe, both II-VI semiconductor compounds, or either GaAs or InP, both III-V semiconductor compounds. FIG. 11B illustrates a cross-sectional view of the photonic system 1000 with a transmission layer 1008 composed of three semiconductor layers that represents an embodiment of the present invention. As shown in FIG. 11B, the transmission layer 1008 is composed of an intermediate semiconductor layer 1102 sandwiched between a top semiconductor layer 1104 and a bottom semiconductor layer 1106, which are composed of substantially identical semiconductors. For example, the intermediate semiconductor layer 1102 can be composed of GaAs and the top and bottom semiconductor layers 1104 and 1106 can both be composed of InP.

The number of different semiconductor materials that can be selected for the transmission layer 1008 may be based on the wavelength of electromagnetic waves to be transmitted within the photonic system 1000. In other words, each semiconductor material has a different corresponding dielectric constant ∈, which is associated with the transmission of certain wavelengths of electromagnetic radiation. For example, a Si transmission layer 1008 has a dielectric constant of approximately 11.8 and can transmit electromagnetic waves with a wavelength greater than approximately 1 μm, while a GaAs transmission layer has a dielectric constant of approximately 8.9 and can transmit electromagnetic waves with wavelengths greater than approximately 0.35 μm.

The lattice constant a and radius of the lattice holes r can be varied to create a photonic band gap that prevent electromagnetic waves over a range of frequencies from being transmitted between the first and second waveguides 1002 and 1006. However, the resonant cavity 1014 can be configured to allow electromagnetic waves over a range of frequencies that lie within the photonic band gap to be transmitted between the first and second waveguides 1002 and 1006 via evanescent coupling. The electromagnetic waves are confined to the area around the resonant cavity 1504.

Figure 12:
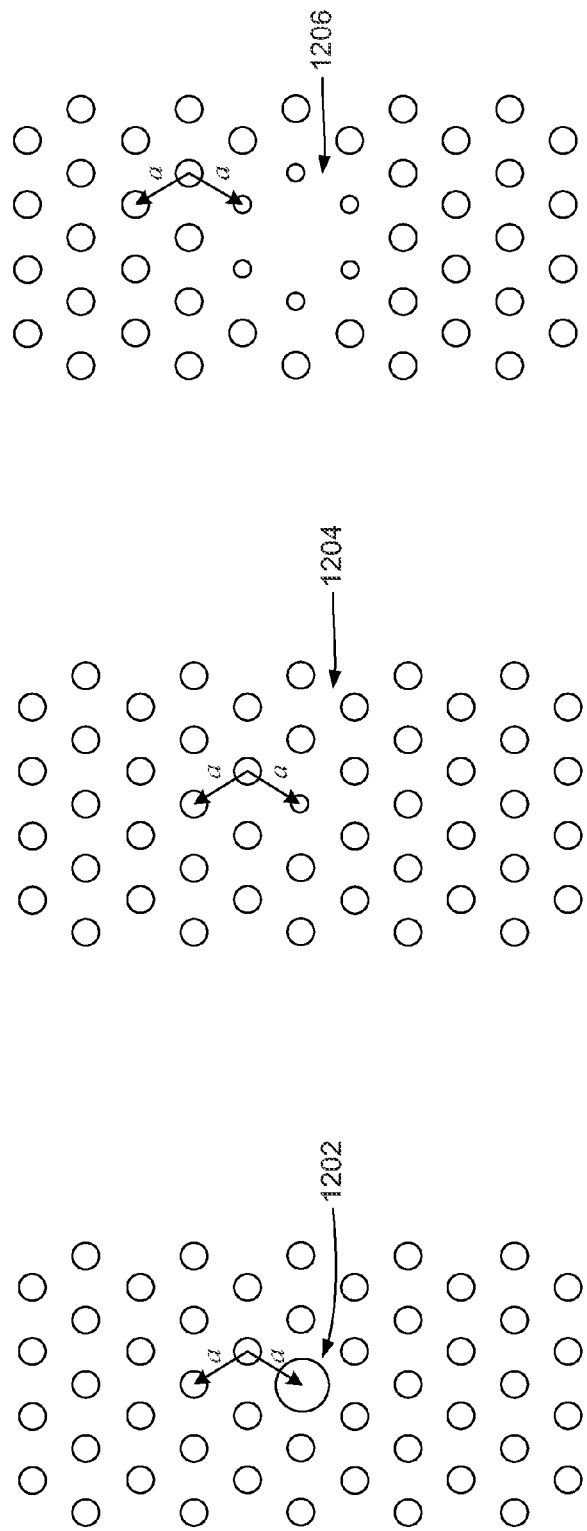
FIG. 12 illustrates three different exemplary resonant cavity configurations, each resonant cavity representing an embodiment of the present invention.

As described above with reference to FIG. 10, the resonant cavity 1014 is created by selectively omitting a hole in the lattice of holes comprising the photonic crystal 1004. However, any number of different kinds of resonant cavity configurations can be formed in the photonic crystal 1004 in accordance with different system embodiments of the present invention. FIG. 12 illustrates three different exemplary resonant cavity configurations, each resonant cavity representing an embodiment of the present invention. As shown in FIG. 12, a first resonant cavity 1202 comprises a single hole with a radius larger than the radius r of the lattice holes, a second resonant cavity 1204 comprises a single hole with a radius smaller than the radius r of the lattice holes, and a third resonant cavity 1206 can be formed by omitting holes and fabricating the surrounding holes with radii smaller than the radius r of the lattice holes. Note that for all three resonant cavities 1202, 1204, and 1206, the lattice constant a of the photonic crystal remains unchanged.

Figure 13:
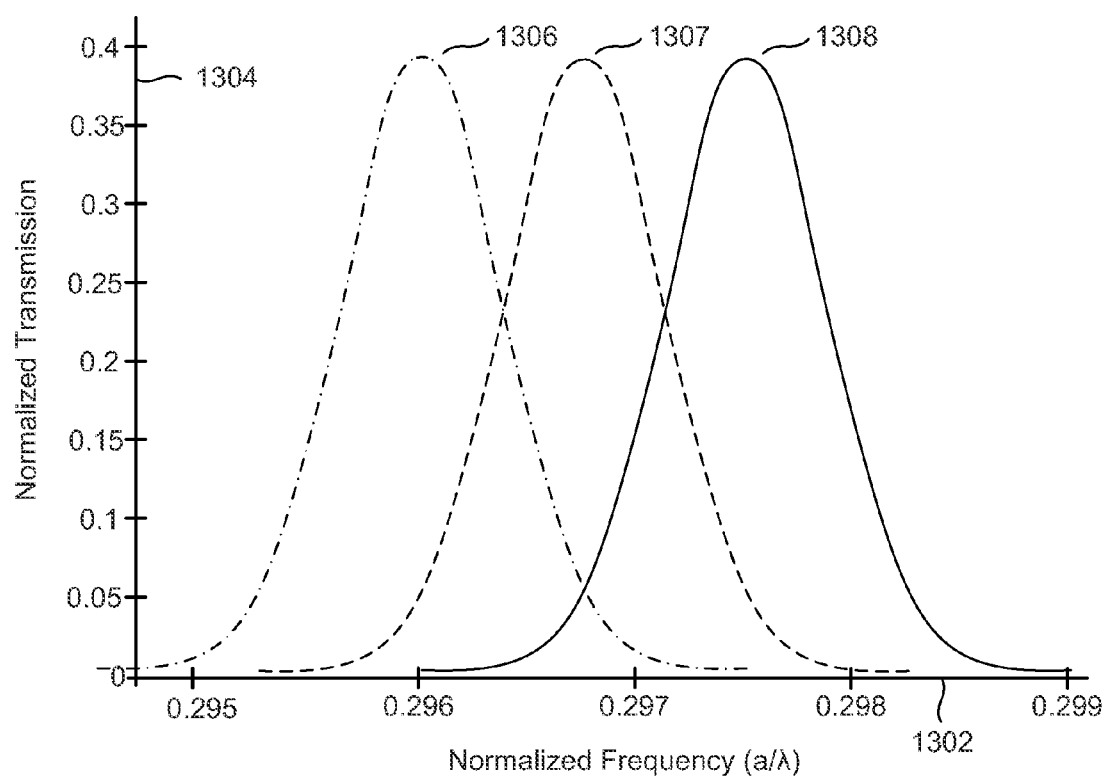
FIG. 13 shows a plot of normalized transmission versus normalized frequencies for electromagnetic waves evanescently transmitted between waveguides in the first photonic system, shown in FIG. 10, that represents an embodiment of the present invention.

In addition to the configuration of the resonant cavity, the type of semiconductor material used to form the transmission layer determines the range of frequencies of electromagnetic waves that may be transmitted between the first and second waveguides 1002 and 1006. FIG. 13 shows a plot of normalized transmission versus normalized frequencies for electromagnetic waves transmitted between the first and second waveguides 1002 and 1006 via the resonant cavity 1014. In FIG. 13, a horizontal axis 1302 corresponds to normalized frequencies $(a/\lambda)$ of electromagnetic waves resonating in the resonant cavity 1014, and a vertical axis 1304 corresponds to normalized transmission of the electromagnetic waves transmitted between the first and second waveguides 1002 and 1006. Normalized transmission curves 1306-1308 correspond to three different transmission layer 1008 semiconductor materials with dielectric constants 10.5, 10.45, and 10.4, respectively. The curves 1306-1308 were generated using a two-dimensional finite difference time domain ("FDTD") numerical method for the photonic crystal 1004 with lattice spacing and radii related by r=0.4a. The FDTD method is one of many well-known numerical methods used to simulate propagation of electromagnetic waves in photonic crystals (see e.g., *Photonic Crystals*, by Jean-Michel Lourtioz et al., Springer-Verlag, Berlin, 2005, pp. 78-88). The curves 1306-1308 show that the intensities of electromagnetic waves are diminished by approximately ½ and that the transmission peak shifts to higher frequencies as the dielectric constant of the transmission layer 1008 decreases. Note also that only electromagnetic waves with frequencies in the frequency domain of the curves 1306-1308 are transmitted between the first and second waveguides 1002 and 1006. For example, for a transmission layer 1008 with a dielectric constant of 10.4, electromagnetic waves with normalized frequencies in the domain from approximate 0.297 to approximately 0.298 can be transmitted between the first and second waveguides 1002 and 1006 via resonant cavity 1014. However, electromagnetic waves with frequencies outside the domain of curve 1308 are not transmitted between the first and second waveguides 1002 and 1006.

Figure 14:
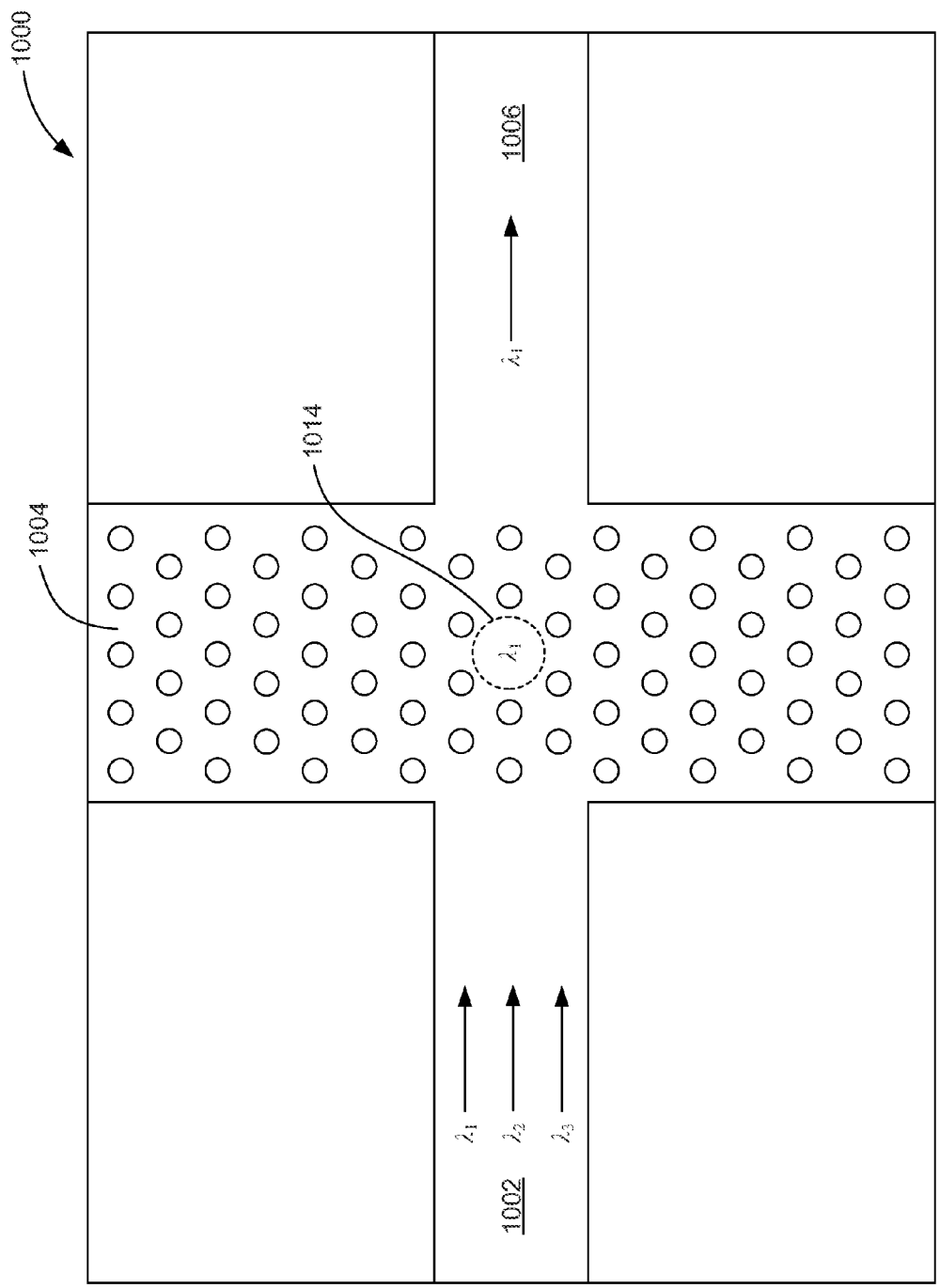
FIG. 14 illustrates an exemplary use of the photonic system, shown in FIG. 10, to filter electromagnetic waves that represents an embodiment of the present invention.

FIG. 14 illustrates an exemplary use of the photonic system 1000 to filter out electromagnetic waves that represents an embodiment of the present invention. As shown in FIG. 14, electromagnetic waves with wavelengths $\lambda_1$, $\lambda_2$, and $\lambda_3$ propagate in the first waveguide 1002 toward the photonic crystal 1004. The lattice constant a and the radius r of the holes are dimensioned so that the electromagnetic waves $\lambda_1$, $\lambda_2$, and $\lambda_3$ fall within the photonic band gap of the photonic crystal 1004. However, the resonant cavity 1004 is configured so that only the electromagnetic wave $\lambda_1$ can resonate in the resonant cavity 1004. As a result, the electromagnetic waves $\lambda_2$, and $\lambda_3$ are reflected by the photonic crystal 1004, while the electromagnetic wave $\lambda_1$ is evanescently coupled into the resonant cavity 1004. The electromagnetic wave $\lambda_1$ is then evanescently coupled into the second waveguide 1006.

Figure 15:
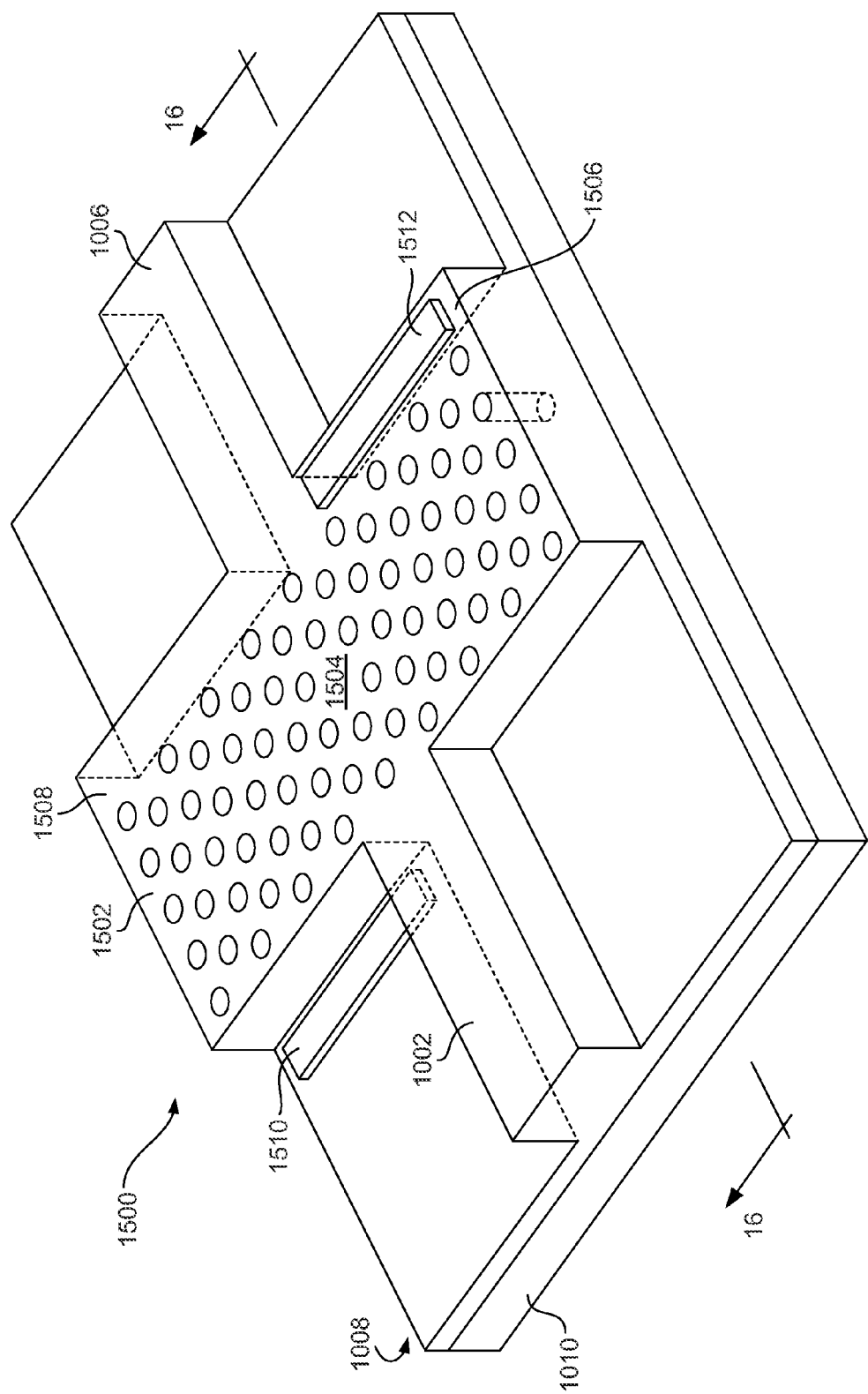
FIG. 15 illustrates an isometric view of a second photonic system that represents an embodiment of the present invention.

FIG. 15 illustrates an isometric view of a photonic system 1500 that represents an embodiment of the present invention. The photonic system 1500 includes a number of components that are structurally similar to the components described above with reference to the photonic system 1000, shown in FIG. 10. Therefore, in the interest of brevity, structurally similar components in the photonic system 1000 and the photonic system 1500 have been provided with the same reference numerals and an explanation of their structure and function is not repeated. The photonic crystal 1502 includes a resonant cavity 1504 located substantially midway between the first and second waveguides 1002 and 1006. Although, the resonant cavity 1504 is formed by omitting a hole from the lattice of holes, the present invention is not limit to such a configuration. In alternate embodiments of the present invention, the resonant cavity 1504 can be configured as described above with reference to FIG. 12. Unlike the photonic crystal 1004 described above with reference to FIGS. 10-13, the photonic crystal 1502 includes extended regions 1506 and 1508, which can be formed from a high refractive index material. The photonic system 1500 also includes a first electrical contact 1510, which is supported on the transmission layer 1008, and a second electrical contact 1512, which is supported by the extended region 1506. The electrical contacts 1510 and 1512 are positioned on opposite sides of the photonic crystal 1500 so that voltages can be applied across the resonant cavity 1502. The electrical contacts 1510 and 1512 can be composed of Cu, Al, Au, Ag, Pt, doped semiconductor materials, or other suitable materials.

FIGS. 16A-16B illustrate cross-sectional views of the photonic system 1500 that represent embodiment of the present invention. As shown in FIGS. 16A-16B, the transmission layer 1008 can be comprised of a single layer of semiconductor material or three layers of semiconductor material, as described above with reference to FIGS. 11A-11B. The electrode 1512 is positioned on the top surface of the extended region 1506.

Figure 17:
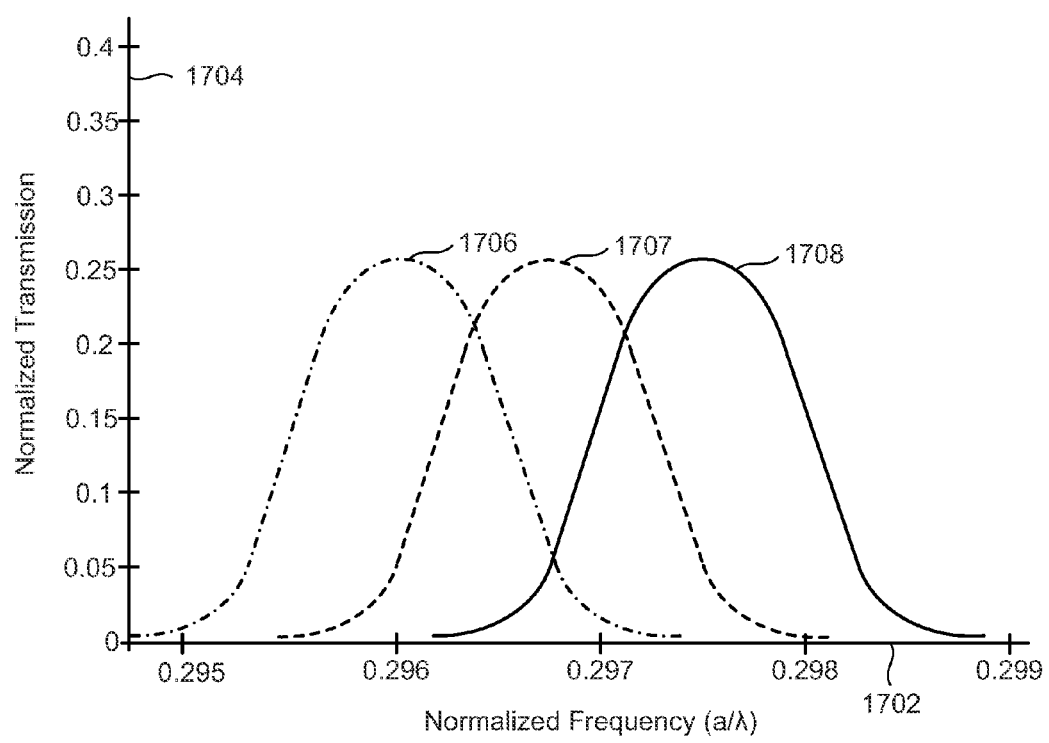
FIG. 17 shows a plot of normalized transmission versus normalized frequencies for electromagnetic waves evanescently transmitted between the waveguides of the second photonic system, shown in FIG. 15, that represents an embodiment of the present invention.

A voltage applied across the resonant cavity 1502 between the first and second electrical contacts 1510 and 1512 changes the dielectric constant of the resonant cavity. In other words, a voltage applied between the electrical contacts 1510 and 1512 shifts the transmission peaks of the photonic system 1500. FIG. 17 shows a plot of normalized transmission versus normalized frequencies for electromagnetic waves transmitted via evanescent coupling between the first and second waveguides 1002 and 1006 through the resonant cavity 1504 that represents an embodiment of the present invention. In FIG. 17, a horizontal axis 1702 corresponds to normalized frequencies $(a/\lambda)$ of electromagnetic waves resonating in the resonant cavity 1504, and a vertical axis 1704 corresponds to normalized transmission of the electromagnetic waves transmitted between the first and second waveguides 1002 and 1006. Normalized transmission curves 1706-1708 correspond to the resonant cavity 1504 having dielectric constant values 10.5, 10.45, and 10.4, which are created by applying three different voltage levels across the resonant cavity 1504. The normalized curves are generated using the FDTD method described above with reference to FIG. 13. In other words, by applying an appropriate voltage across the resonant cavity 1504, the dielectric constant of the resonant cavity 1504 can be shifted away from transmitting electromagnetic waves over a particular range of frequencies. For example, suppose that initially the dielectric constant of the resonant cavity 1504 is approximately 10.4. As a result, the curve 1708 shows that electromagnetic waves with frequencies ranging from approximately 0.297 to approximately 0.298 can be transmitted between the first and second waveguides 1002 and 1006. However, when an appropriate voltage is applied between the electrical contacts 1510 and 1512, the dielectric constant of the resonant cavity can be shifted to 10.5, which corresponds to the curve 1706. As shown in FIG. 17, the electromagnetic waves with frequencies ranging from approximately 0.297 to approximately 0.298 can no longer be transmitted between the first and second waveguides 1002 and 1006.

Note that by comparing the normalized transmissions shown in FIGS. 13 and 17, the high refractive index extended regions 1506 and 1508 decrease the transmission of electromagnetic waves between the first and second waveguides 1002 and 1006. In alternate embodiments of the present invention, this transmission decrease can be avoided by etching air gaps between the second waveguide 1006 and the extended regions 1506 and 1508. Otherwise, the transmission drops by approximately 4.1 dB for $\Delta \in / \in$ equal to approximately 0.0048 and by approximately 14.0 dB for $\Delta \in / \in$ equal to approximately 0.0095, respectively. Also note that the electrical contacts 1510 and 1512 do not affect transmission of electromagnetic waves.

Figure 18A:
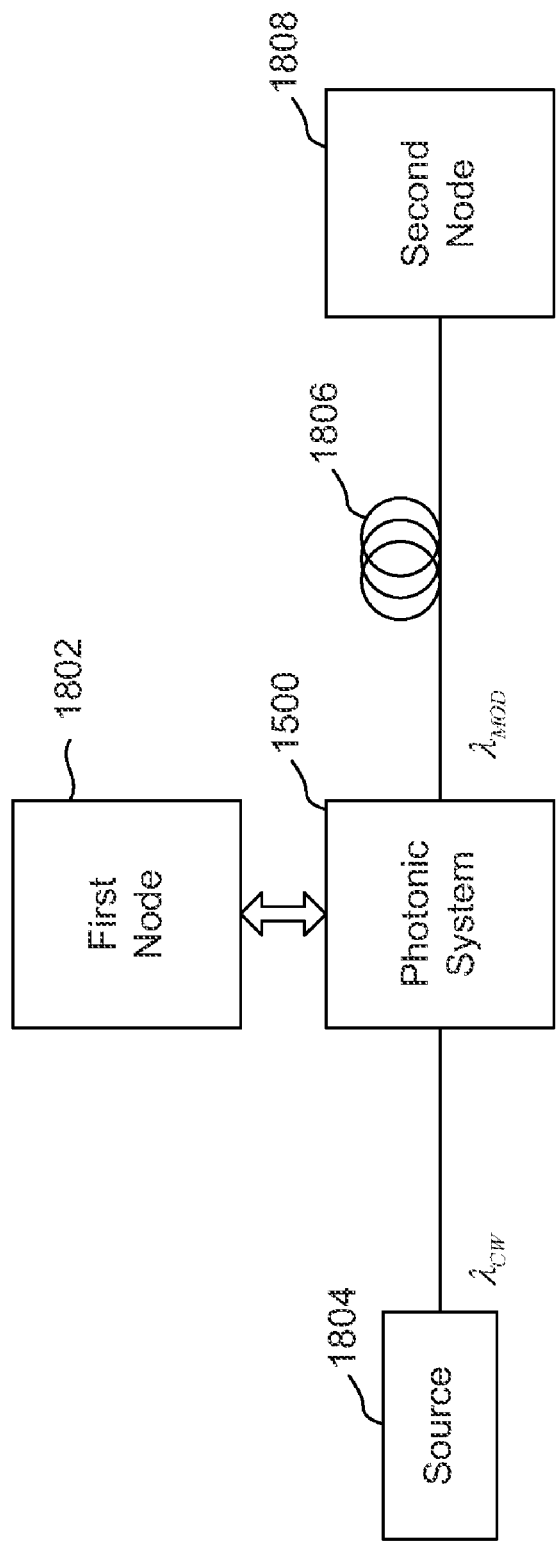
FIGS. 18A-18B illustrate schematic representations of the second photonic system, shown in FIG. 15, operated as an electromagnetic wave modulator that represents an embodiment of the present invention.
Figure 18B:
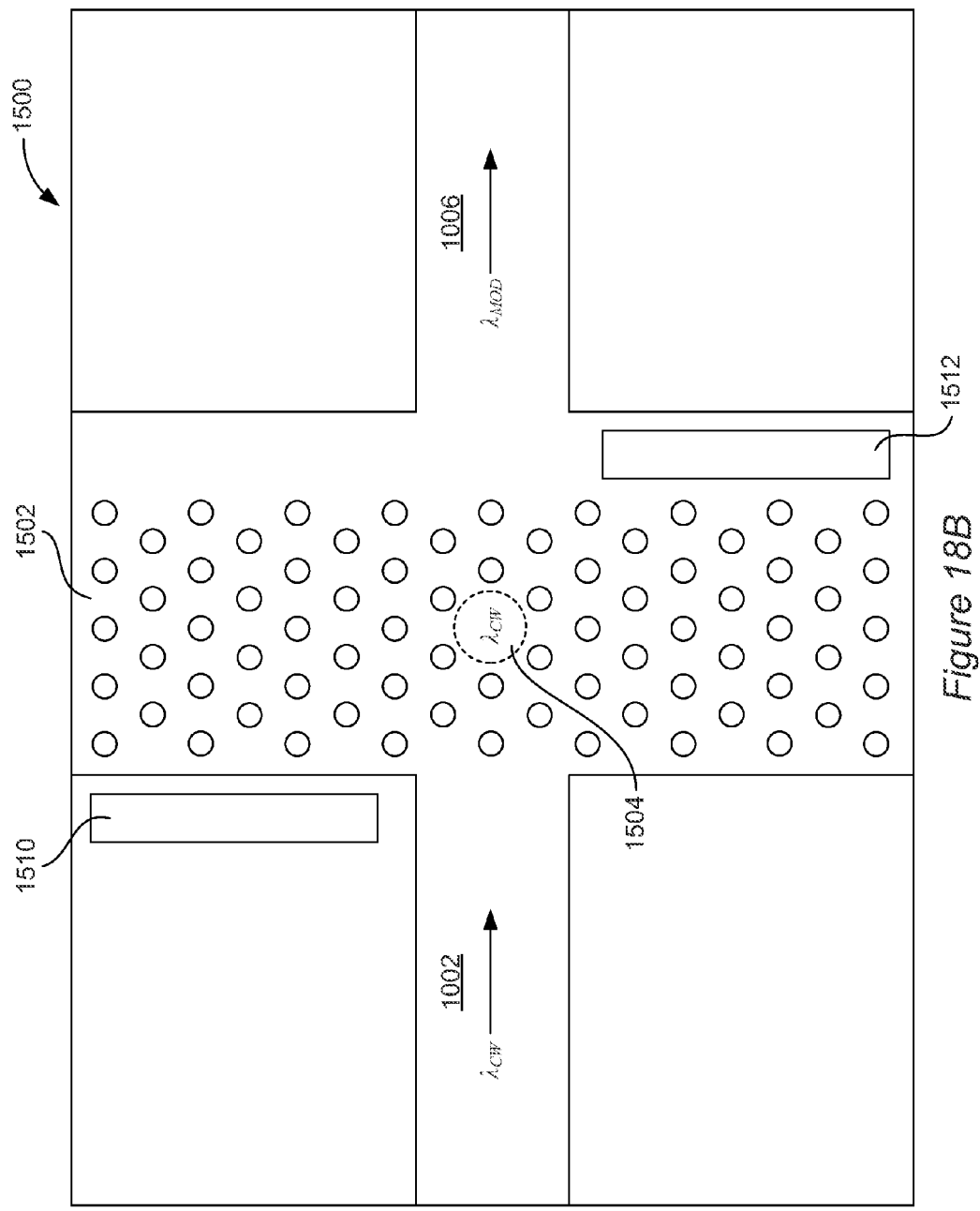

The photonic system 1500 can be operated as a modulator to encode information in carrier electromagnetic waves ("carrier waves"). FIGS. 18A-18B illustrate schematic representations of the photonic system 1500 operated as a modulator that represents an embodiment of the present invention. In FIG. 18A, the photonic system 1500 is electronically coupled to a first node 1802, which can be a processor, memory, or other data storage or data generating electronic device. The first node 1802 encodes data in electrical signals that are transmitted to the photonic system 1500. A source 1804 generates a carrier wave $\lambda_{CW}$ that is also transmitted to the photonic system 1500. Now referring to FIG. 18B, the carrier wave $\lambda_{CW}$ generated by the source 1804 is transmitted in the first waveguide 1002 to the photonic crystal 1502. The carrier wave $\lambda_{CW}$ is evanescently coupled into the resonant cavity 1504. While the carrier wave $\lambda_{CW}$ is evanescently coupled into the resonant cavity 1504, the electrical contacts 1510 and 1512 also receive the electrical signals that generate an oscillating voltage, that also encodes the information generated by the node 1802, across the resonant cavity 1504. The voltage oscillations modulate the carrier wave $\lambda_{CW}$ to generate a modulated electromagnetic wave $\lambda_{MOD}$ that encodes the same information and is evanescently coupled into the second waveguide 1006. Returning to FIG. 18A, the modulated electromagnetic wave $\lambda_{MOD}$ can be transmitted over large distances in an optical fiber 1806 to a second node 1808 for processing. In alternate embodiments of the present invention, the modulated electromagnetic wave $\lambda_{MOD}$ can be transmitted over photonic crystal waveguides, ridge waveguides, or through free space.

Figure 19A:
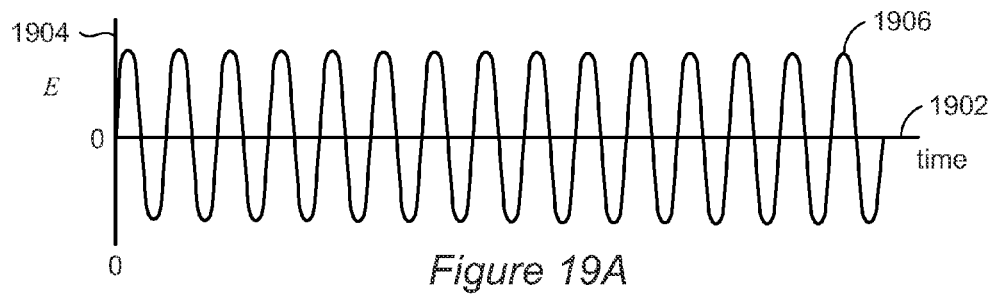
FIGS. 19A-19E show plots representing three ways in which information can be encoded in carrier electromagnetic waves using the second photonic system, shown in FIG. 15, that represents an embodiment of the present invention.

FIGS. 19A-19E provide a conceptual representation of encoding information in carrier waves using the photonic system 1500 as described above with reference to FIGS. 18A-18B that represents an embodiment of the present invention. Information in computational systems is typically represented by sequences of bits. Each bit is equivalent to a choice between two alternatives, such as "yes" and "no," or "on" and "off." The two states for a single bit are typically represented by the binary numbers "1" and "0." Although an electromagnetic wave comprises a magnetic field component and an electric field component, for the sake of simplicity, the carrier wave is represented in the following discussion by the electric field component:

$$E(z,t)=E_0 \cos(zk-\omega t)$$

where the electric field propagates in the z direction, $\omega$ is angular frequency, k is a wave vector $\omega/c$, t is time, and $E_0$ is the electric field amplitude. FIG. 19A shows a plot of the electric field component of a carrier wave versus time. In FIG. 19A, and in subsequent FIGS. 19C-19E, a horizontal line 1902 is a time axis and a vertical line 1904 is the amplitude E.

Figure 19B:
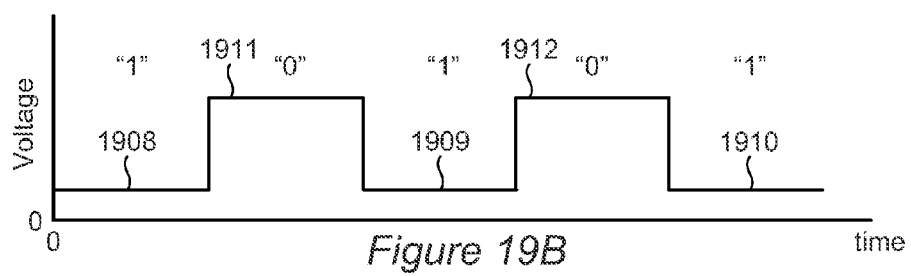

A curve 1906 represents the electric field component E(z,t) of a carrier wave with a regular vibrational frequency. The carrier wave 1906 is transmitted in the first waveguide 1002 and evanescently coupled into the resonant cavity 1504. In order to produce the modulated electromagnetic wave $\lambda_{MOD}$ described above with reference to FIG. 18, the voltage across the resonant cavity 1504 is varied in accordance with the electrical signals provided by the first node 1802, shown in FIG. 18A. FIG. 19B shows a plot of voltage versus time of an oscillating voltage encoding a binary number "10101" that represents one of many possible ways in which the voltage applied to the resonant cavity 1504 can be varied to encode information. The lower voltages 1908-1910 correspond to the binary number "1," while the higher voltages 1911 and 1912 correspond to the binary number "0."

Figure 19C:
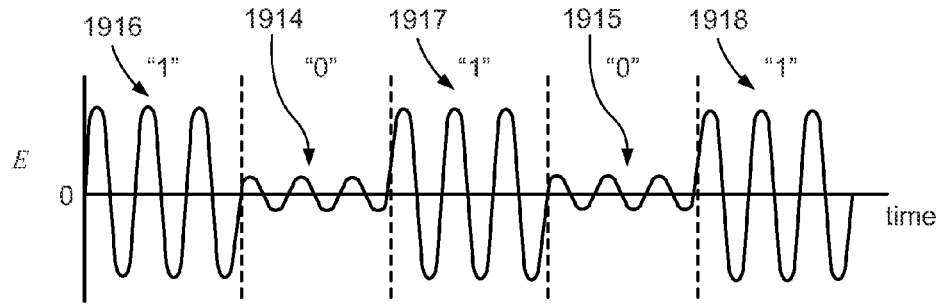

The photonic system 1500 can produce the modulated electromagnetic wave $\lambda_{MOD}$ by modulating the carrier wave $\lambda_{CW}$ amplitude. FIG. 19C illustrates an example of an amplitude modulated electromagnetic wave $\lambda_{MOD}$ encoding the binary sequence "10101" in accordance with the voltage shown in FIG. 19B. In FIG. 19C, a single bit corresponds to four consecutive cycles of the signal. The cycles 1914 and 1915 have small amplitudes, which correspond to the binary number "0" and are achieved by shifting the dielectric constant of the resonant cavity 1504 away from transmitting the carrier wave between the first and second waveguides 1002 and 1006 when the voltage across the resonant cavity corresponds to the higher voltage levels 1911 and 1912, respectively, as described above with reference to FIG. 17. The cycles 1916-1918 have large amplitudes, which correspond to the binary number "1" and are achieved by little to no shifting of the dielectric constant of the resonant cavity 1504 when the voltage across the resonant cavity 1504 corresponds to the lower voltage levels 1908-1910, respectively.

Figure 19D:
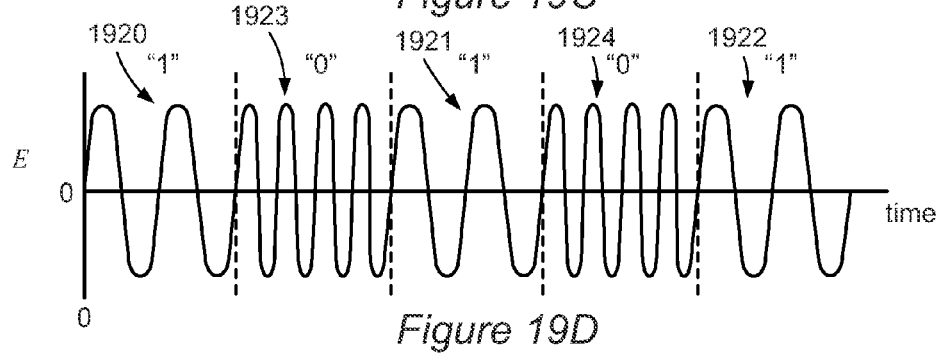
Figure 19E:
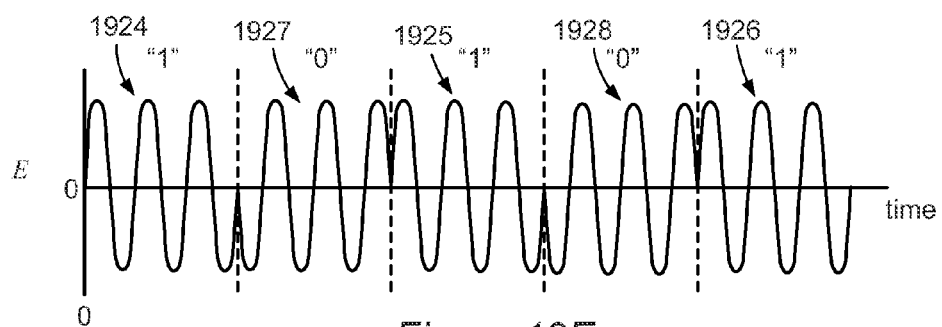

The photonic system 1500 can also produce the modulated electromagnetic wave $\lambda_{MOD}$ by modulating the carrier wave $\lambda_{CW}$ frequency or phase. FIGS. 19D-19E represent frequency and phase modulated electromagnetic waves, respectively, and each can be accomplished by applying appropriate oscillating voltages to change the dielectric constant of the resonant cavity 1504. FIG. 19D illustrates an example of a frequency modulated electromagnetic signal encoding of the binary number "10101" in accordance with a voltage pattern not shown. In FIG. 19D, the lower frequency cycles 1920-1922 correspond to the binary number "1," and higher frequency cycles 1923 and 1924 correspond to the binary number "0." Phase modulation is used to encode information by shifting the phase of the carrier wave as follows:

$$E(z,t)=E_0 \cos(zk-\omega t+\phi)$$

where $\phi$ represents a phase shift. FIG. 19E illustrates an example of a phase modulated electromagnetic wave encoding of the binary numbers "0" and "1." In FIG. 19E, the cycles 1924-1926 correspond to a binary number "1," and the cycles 1927 and 1928 include a ½ cycle phase shift from the cycles 1924-1926 and correspond to the binary number "0." The electromagnetic signals can also be modulated for telecommunications signals. For example, electromagnetic signals can be modulated for a return-to-zero ("RZ") or non-return-to-zero ("NRZ") line codes in telecommunication signals.

Figure 20:
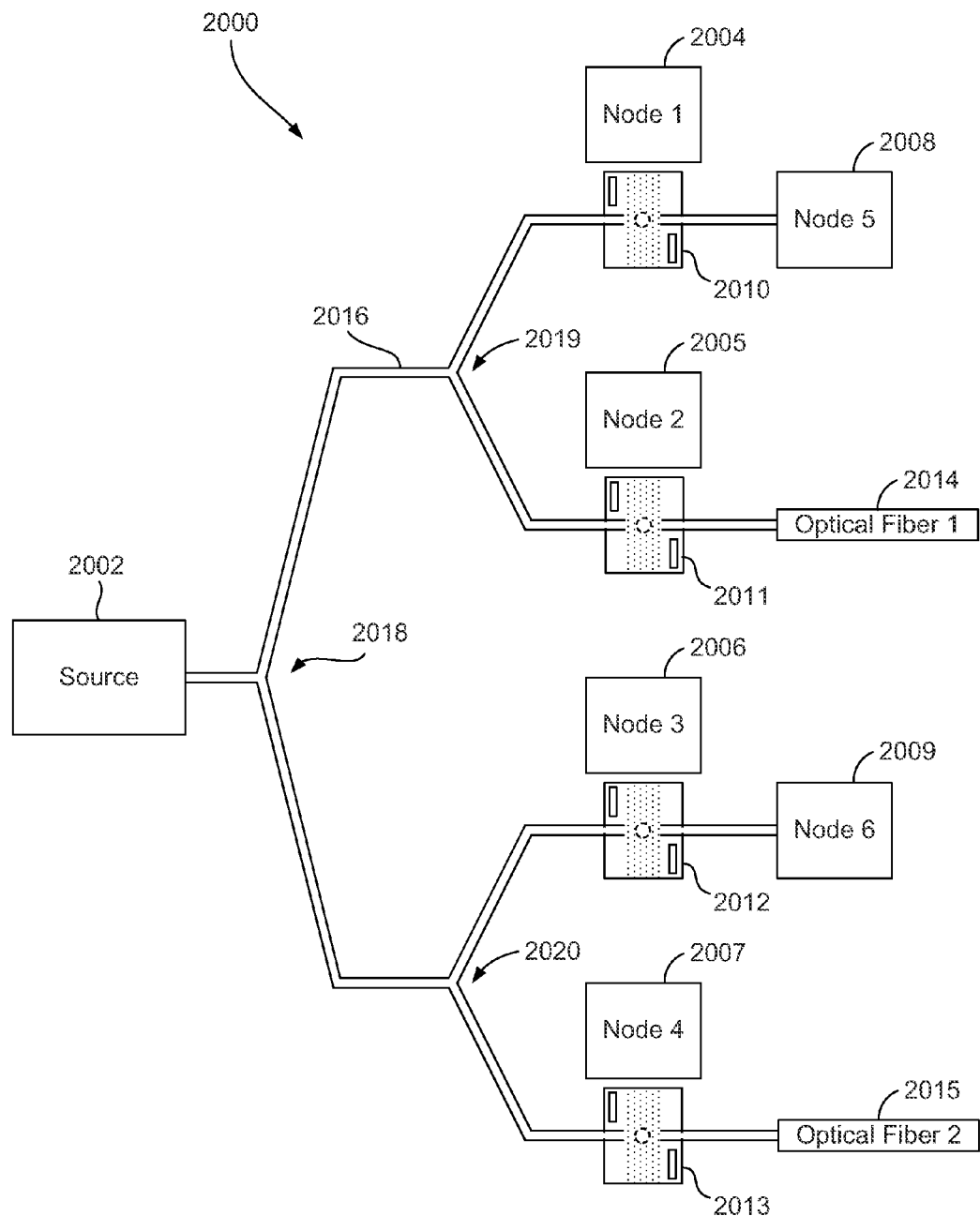
FIG. 20 illustrates a first exemplary photonic integrated circuit including four second photonic systems, shown in FIG. 15, to encode information that represents an embodiment of the present invention.

The photonic system 1500 can be used to encode information in a PIC. FIG. 20 illustrates an exemplary PIC 2000 including four photonic systems to encode information that represents an embodiment of the present invention. The PIC 2000 includes a source 2002, six nodes 2004-2009, four photonic systems 2010-2013, and two optical fibers 2014 and 2015 that are coupled to other optical or electronic devices (not shown). The nodes 2004-2009 can be any combination of electronic processors, memory, sensors, or other electronic data generating devices. The photonic systems 2010-2013 are electronically coupled to the nodes 2004-2007, as described above with reference to FIG. 18A. The source 2002 is coupled to the photonic systems via waveguides, such as waveguide 2016. The waveguides can be ridge waveguides or photonic crystal waveguides in a single transmission layer, or optical fibers. The source 2002 generates a carrier wave $\lambda_{CW}$ that is transmitted via the waveguides to photonic systems 2010-2013. The nodes 2004-2007 encode information in the carrier wave $\lambda_{CW}$ to produce four differently modulated electromagnetic waves $\lambda_{MOD}$, as described above with reference to FIGS. 18-19. The modulated electromagnetic waves $\lambda_{MOD}$ are transmitted separately to the nodes 2008 and 2009 and the optical fibers 2014 and 2015.

Figure 21A:
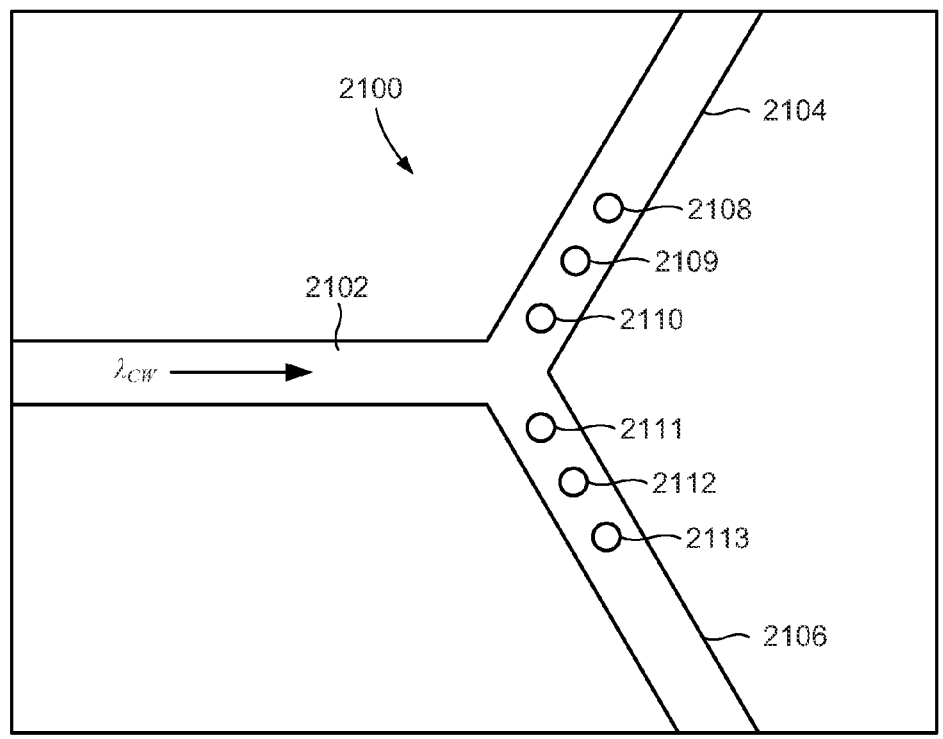
FIGS. 21A-21B illustrate operation of a first photonic switch that represents an embodiment of the present invention.
Figure 21B:
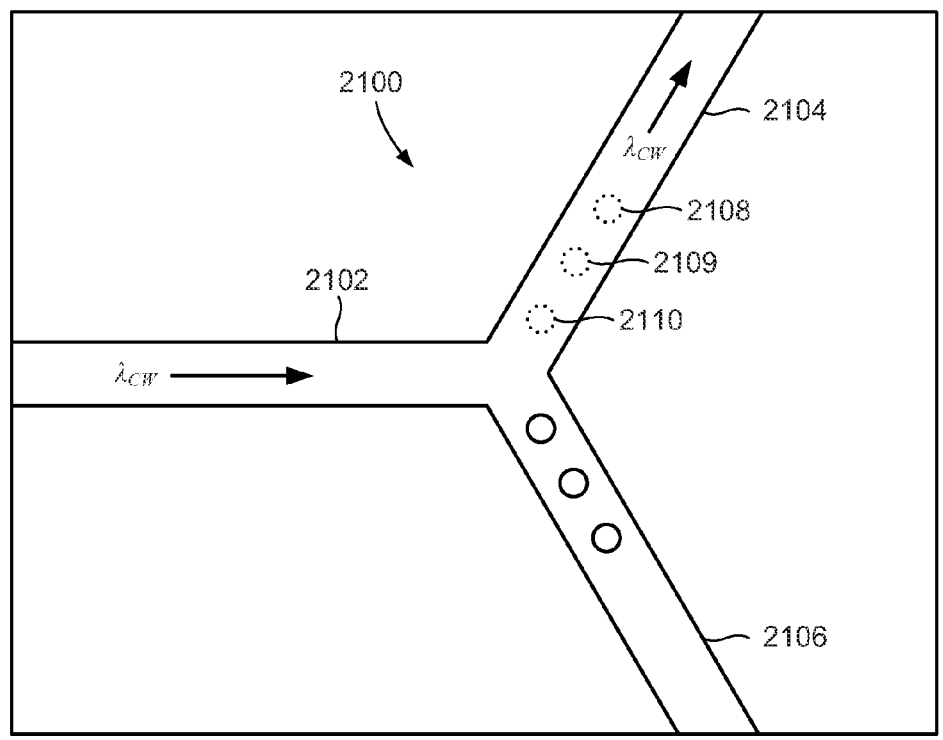

A PIC may also include photonic switches at waveguide junctions for regulating transmission of carrier waves to different nodes. For example, as shown in FIG. 20, photonic switches may be located at ridge waveguide junctions 2018-2020. FIGS. 21A-21B illustrate operation of a first photonic switch 2100 that represents an embodiment of the present invention. The photonic switch 2100 comprises a single ridge waveguide 2102 that bifurcates into a first ridge waveguide 2104 and a second ridge waveguide 2106. As shown in FIG. 21A, the first ridge waveguide 2104 includes holes 2108-2110, and the second ridge waveguide 2106 include holes 2111-2113. The holes 2108-2113 prevent a carrier wave $\lambda_{CW}$ from being transmitted through the first and second ridge waveguides 2104 and 2106. As a result, the first and second waveguides 2104 and 2106 are said to be turned "off." On the other hand, the carrier wave $\lambda_{CW}$ can be transmitted through either of the first and second waveguides 2104 and 2106 by filling the holes with a liquid having a refractive index that is substantially identical to the refractive index of the first and second waveguides 2104 and 2106. As shown in FIG. 21B, three dotted circles represent the holes 2108-2110 in the waveguide 2204 that are filled with the liquid. As a result, the carrier wave $\lambda_{CW}$ can be transmitted beyond the junction via the first waveguide 2104, which is said to be turned "on."

Figure 22A:
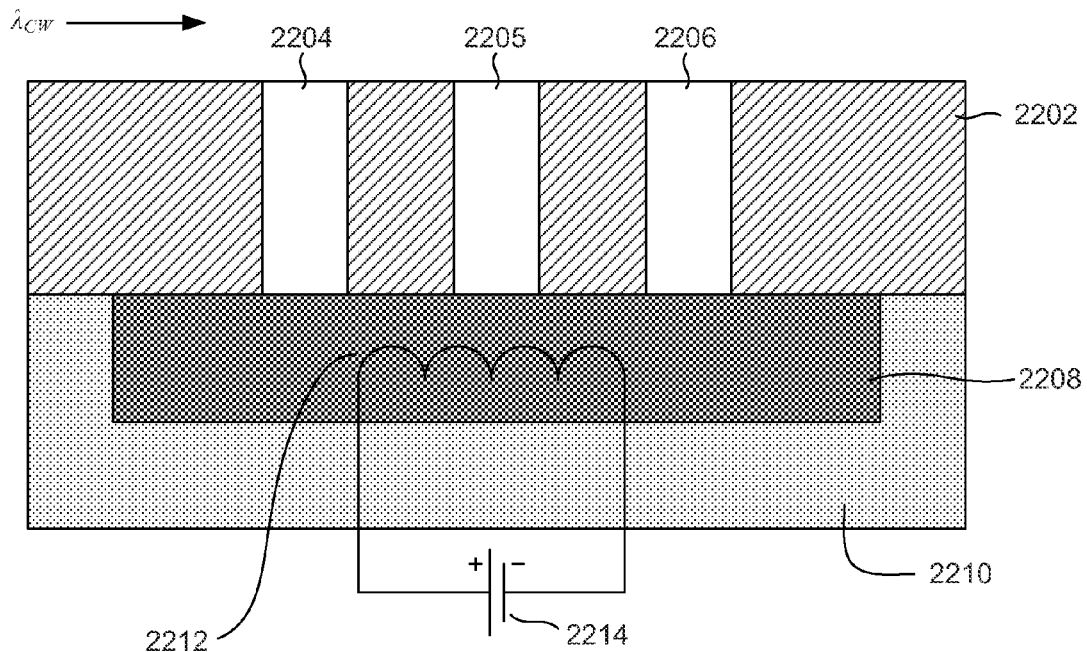
FIGS. 22A-22B illustrate a cross-sectional view of a waveguide and a reservoir of a photonic switch that represents an embodiment of the present invention.
Figure 22B:
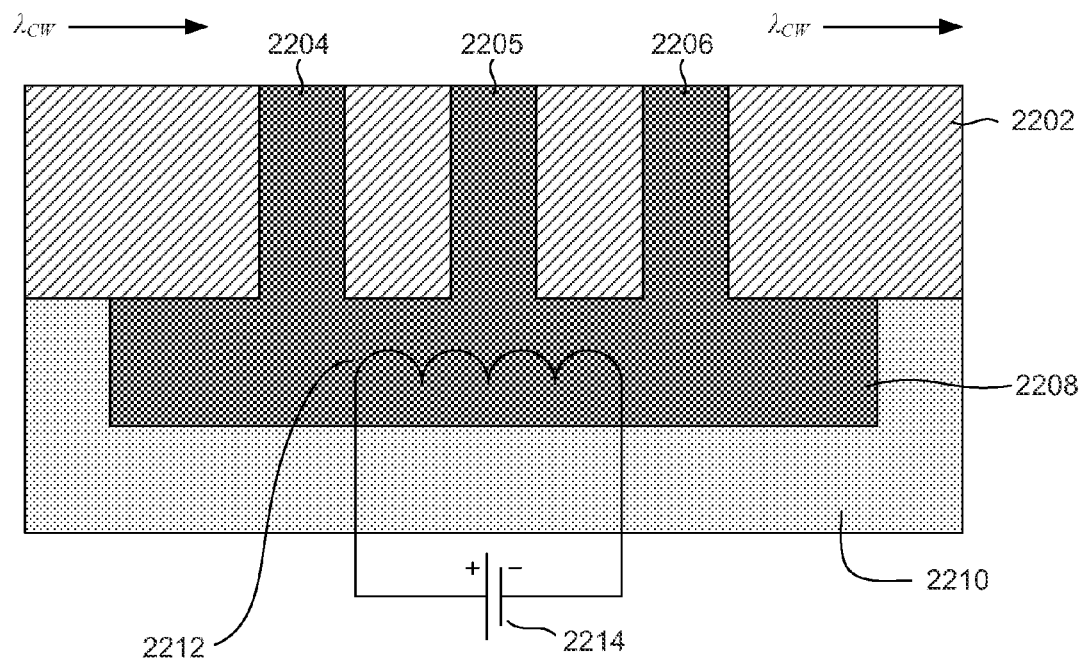

FIGS. 22A-22B illustrate a cross-sectional view of three holes in a waveguide of a photonic switch that represents an embodiment of the present invention. As shown in FIG. 22A, a waveguide 2202 includes three holes 2204-2206 that span the height of the waveguide 2202. A reservoir 2208 is located within the substrate 2210 and beneath the three holes 2204-2206. The reservoir 2208 is filled with a liquid having substantially the same refractive index as the waveguide 2202. The photonic switch also includes a resistor coil 2212 connected to an electrical source 2214. In other words, the resistor coil 2212 operates as a heating element that heats the liquid within the reservoir 2208.

Turning the waveguide 2202 "on" and "off" is described with reference to FIGS. 22A-22B. Referring to FIG. 22A, none of the liquid stored in the reservoir 2208 fills the holes 2204-2206. As a result, the carrier wave $\lambda_{CW}$ is not transmitted beyond the holes 2204-2206 and the waveguide is turned "off." However, referring to FIG. 22B, the waveguide 2202 can be turned "on" when an electrical current generated by the electrical source 2214 is passed through the resistor coil 2212. The resistor coil 2212 heats up, which heats the liquid in the reservoir 2208 causing the liquid to expand and fill the holes 2204-2206. Because the liquid has a refractive index that is substantially identical to the refractive index of the waveguide 2202, the carrier wave $\lambda_{CW}$ is transmitted beyond the holes 2204-2206. The waveguide 2202 is turned "off" by turning "off" the electronic source 2214 and by allowing the liquid to cool and contract.

Figure 23:
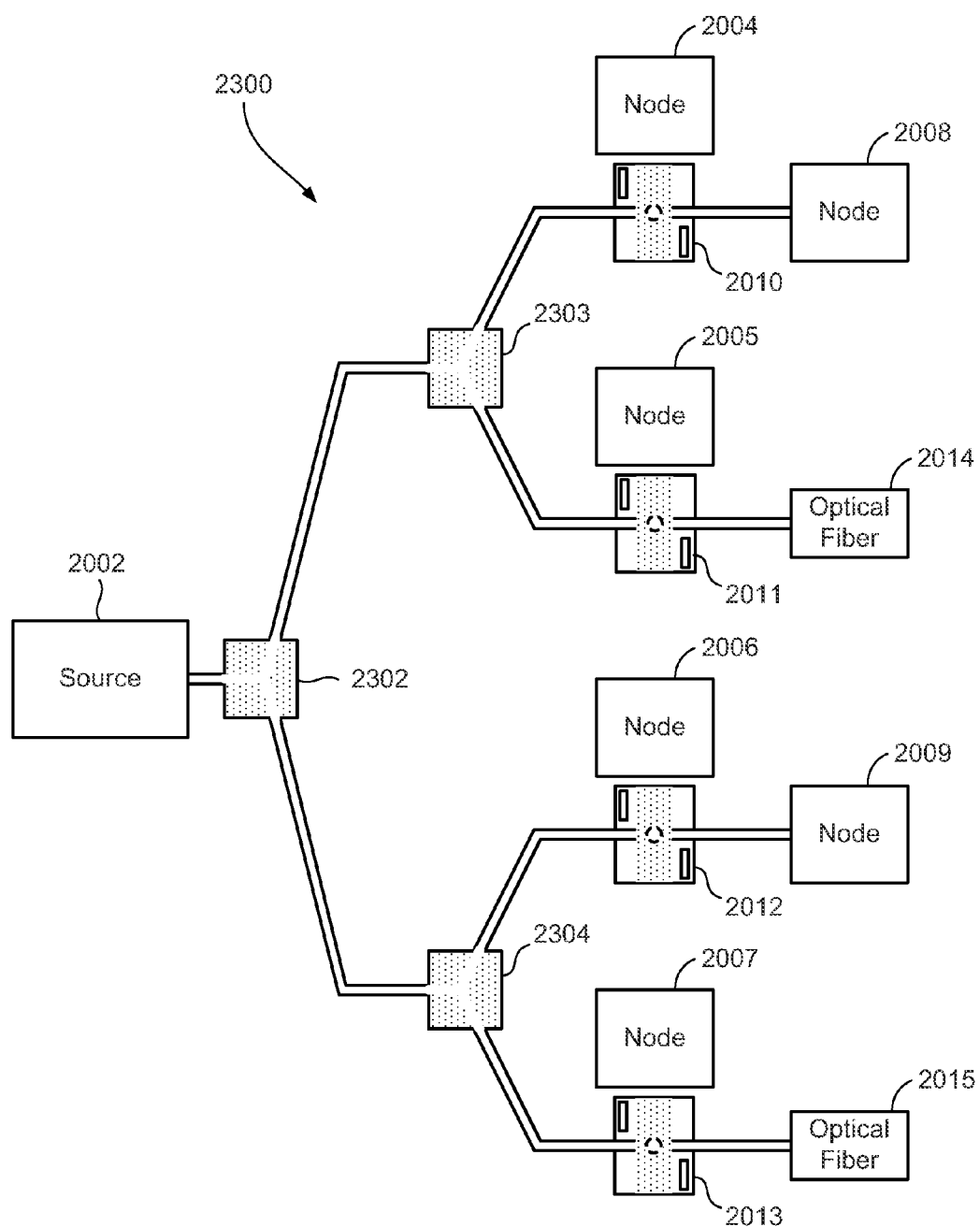
FIG. 23 illustrates a second exemplary photonic integrated circuit including four second photonic systems, shown in FIG. 15, that represents an embodiment of the present invention.

In an alternate embodiment of the present invention, photonic switches may be fabricated in a PIC using photonic crystal waveguide junctions. FIG. 23 illustrates a second exemplary PIC 2300 including photonic systems that represents an embodiment of the present invention. The PIC 2300 includes a number of components that are structurally similar to the components described above with reference to the PIC 2000, shown in FIG. 20. Therefore, in the interest of brevity, structurally similar components have been provided with the same reference numerals and an explanation of their structure and function is not repeated. However, unlike the PIC 2000, shown in FIG. 20, photonic-crystal-based switches 2302-2304 are used to regulate transmission of carrier waves to the nodes 2004-2007.

Figure 24A:
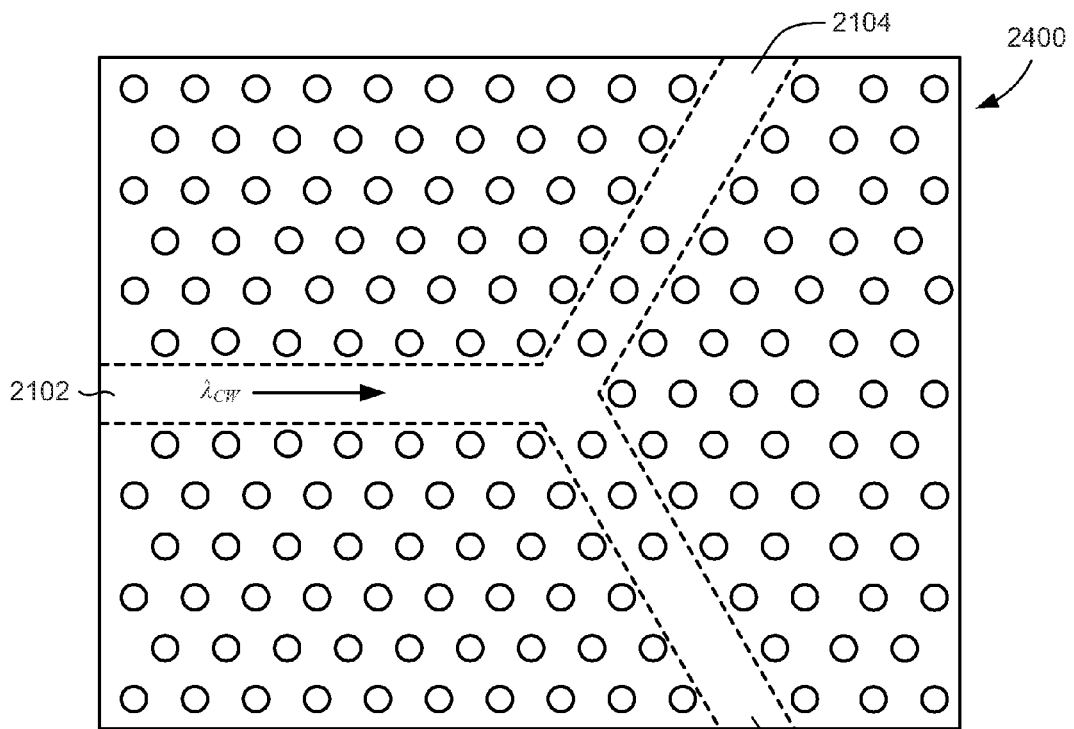
FIGS. 24A-24B illustrate operation of a photonic-crystal-based switch that represents an embodiment of the present invention.
Figure 24B:
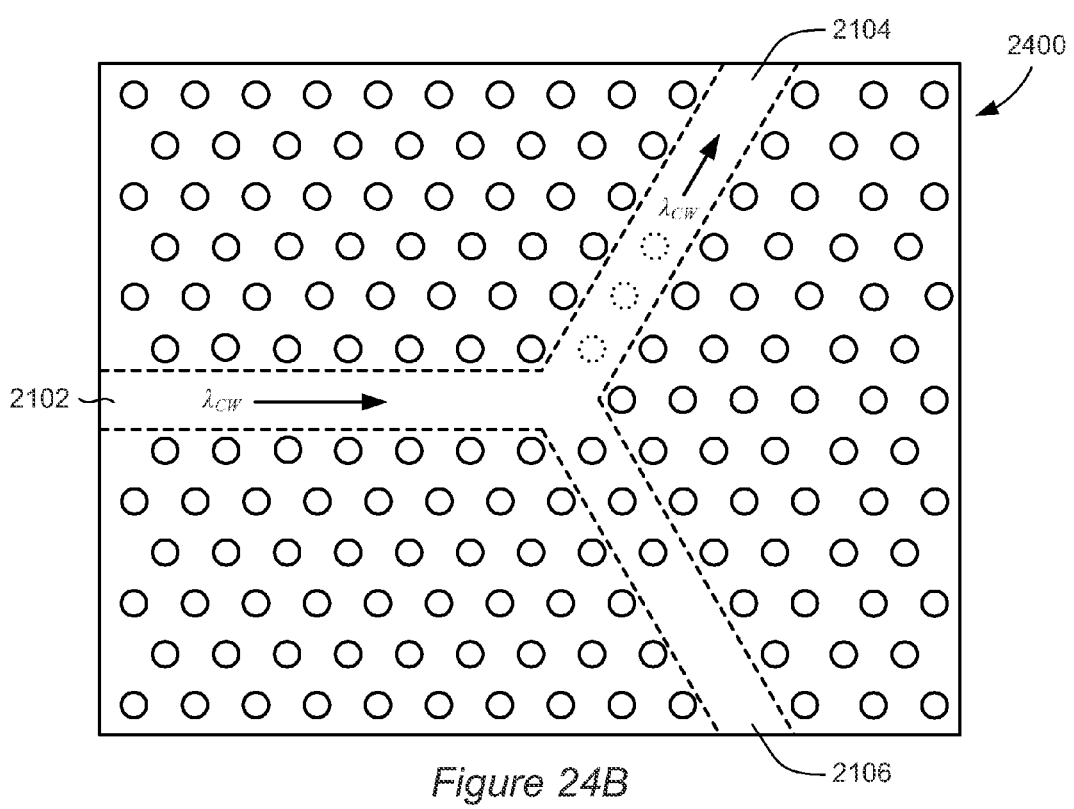

FIGS. 24A-24B illustrate operation of a photonic-crystal-based switch that represents an embodiment of the present invention. The photonic-crystal-based switch 2400 comprises a single waveguide 2402 that bifurcates into a first waveguide 2404 and a second waveguide 2406. As shown in FIG. 24A, the first and the second waveguides 2404 and 2406 includes three holes. The holes prevent a carrier wave $\lambda_{CW}$ from being transmitted beyond the junction and the first and second waveguides 2104 and 2106 are said to be turned "off." The carrier wave $\lambda_{CW}$ can be transmitted through the first and second waveguides 2104 and 2106 by filling the holes with a liquid having a refractive index that is substantially identical to the refractive index of the photonic crystal slab. As shown in FIG. 24B, three dotted-line circles in the waveguide 2204 represent holes that are filled with the liquid. As a result, the carrier wave $\lambda_{CW}$ can be transmitted beyond the junction and the waveguide 2404, and the waveguide 2204 is said to be turned "on." The holes can be filled as described above with reference to FIGS. 22A-22B.

Although the present invention has been described in terms of particular embodiments, it is not intended that the invention be limited to these embodiments. Modifications within the spirit of the invention will be apparent to those skilled in the art. In an alternate embodiment of the present invention, those skilled in the art would recognize that more holes can added to waveguides in the photonic switches. In alternate embodiments of the present invention, the photonic switches may three or more waveguide that are output from a single waveguide. In alternate embodiments of the present invention, the photonic crystals 1004, shown in FIG. 10, and the photonic crystal 1502, shown in FIG. 15, can be doped with positive carriers, negative carriers, or other dopants so that the dielectric constant of the photonic crystals 1004 and 1502 are different from that of the first and second ridge waveguides 1002 and 1006. In alternate embodiments of the present invention, rather than employing the resistor coil 2212 to generate heat that causes the liquid to fill the holes in the photonic crystal, as described above with reference to FIG. 22, a piezoelectric pump can be used to force the liquid stored in the reservoir into the holes.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for encoding data in carrier electromagnetic waves, the method comprising:
   transmitting a number of carrier electromagnetic waves in a first ridge waveguide formed in a transmission layer;
   coupling one or more of the carrier electromagnetic waves into a resonant cavity of a photonic crystal coupled to the first ridge waveguide, the photonic crystal including an extended region configured to support a first electrode disposed on the extended region;
   applying voltages to the first electrode and to a second electrode disposed on the transmission layer adjacent to the photonic crystal to modulate the one or more carrier electromagnetic waves within the resonant cavity in order to generate data encoded electromagnetic waves; and
   coupling the data encoded electromagnetic waves into a second ridge waveguide formed in the transmission layer.

2. The method of claim 1 wherein the photonic crystal further comprises one of:
   Si;
   a III-V semiconductor; and
   a II-VI semiconductor.

3. The method of claim 1 wherein modulating the one or more carrier electromagnetic waves within the resonant cavity further comprises toggling a voltage applied across the resonant cavity.

4. The method of claim 3 wherein toggling the voltage applied across the resonant cavity further comprises changing one of:
   amplitude of the carrier electromagnetic wave;
   frequency of the carrier electromagnetic wave; and
   phase of the carrier electromagnetic wave.

5. The method claim 1 where coupling the electromagnetic waves further comprises evanescently coupling the electromagnetic waves.

* * * * *